United States Patent
Ramasubramonian et al.

(10) Patent No.: US 9,819,941 B2
(45) Date of Patent: Nov. 14, 2017

(54) SIGNALING FOR SUB-DECODED PICTURE BUFFER (SUB-DPB) BASED DPB OPERATIONS IN VIDEO CODING

(71) Applicant: QUALCOMM Incorporated, San Diego, CA (US)

(72) Inventors: Adarsh Krishnan Ramasubramonian, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 14/509,797

(22) Filed: Oct. 8, 2014

(65) Prior Publication Data

US 2015/0103884 A1  Apr. 16, 2015

Related U.S. Application Data

(60) Provisional application No. 61/889,515, filed on Oct. 10, 2013, provisional application No. 61/890,841, filed on Oct. 14, 2013.

(51) Int. Cl.
| | |
|---|---|
| H04N 19/423 | (2014.01) |
| H04N 19/70 | (2014.01) |
| H04N 19/156 | (2014.01) |
| H04N 19/597 | (2014.01) |
| H04N 19/196 | (2014.01) |
| H04N 19/463 | (2014.01) |
| H04N 19/177 | (2014.01) |

(Continued)

(52) U.S. Cl.
CPC ......... *H04N 19/156* (2014.11); *H04N 19/177* (2014.11); *H04N 19/196* (2014.11); *H04N 19/31* (2014.11); *H04N 19/423* (2014.11); *H04N 19/44* (2014.11); *H04N 19/463* (2014.11); *H04N 19/597* (2014.11); *H04N 19/70* (2014.11)

(58) Field of Classification Search
CPC .......................................... H04N 19/00–19/99
See application file for complete search history.

(56) References Cited

U.S. PATENT DOCUMENTS

| | | | |
|---|---|---|---|
| 2014/0098897 A1* | 4/2014 | Rodriguez | H04N 19/70 375/240.26 |
| 2015/0016545 A1 | 1/2015 | Ramasubramonian et al. | |
| 2016/0044324 A1* | 2/2016 | Deshpande | H04N 19/70 375/240.25 |

OTHER PUBLICATIONS

Choi, B., et al., "Decoded picture buffer for HEVC extension", Joint Collaborative Team on Video Coding (JCT-VC) of ITU-T SG 16 WP 3 and ISO/IEC JTC 1/SC 29/WG 11, 13th Meeting: Incheon, KR, Document: JCTVC-M0169, pp. 1-5 (Apr. 9, 2013).*

(Continued)

*Primary Examiner* — William C Vaughn, Jr.
*Assistant Examiner* — Lindsay Uhl
(74) *Attorney, Agent, or Firm* — Shumaker & Sieffert, P.A.

(57) ABSTRACT

A method of decoding video data including receiving an encoded video bitstream that includes a plurality of pictures and storing the plurality of pictures in one or more sub-DPBs. The method further including receiving a respective set of sub-DPB parameters for each respective operation point of the encoded video bitstream. applying the respective set of sub-DPB parameters to all layers of an output layer set for each respective operation point, and performing a sub-DPB management process on the one or more sub-DPBs in accordance with the received respective single sets of sub-DPB parameters.

38 Claims, 9 Drawing Sheets

(51) Int. Cl.
H04N 19/44 (2014.01)
H04N 19/31 (2014.01)

(56) References Cited

OTHER PUBLICATIONS

Choi, Byeongdoo, et al., "Decoded picture buffer for HEVC extension", Joint Collaborative Team on Video Coding (JCT-VC) of ITU-T SG 16 WP 3 and ISO/IEC JTC 1/SC 29/WG 11, 13th Meeting: Incheon, KR, Document: JCTVC-M0169, pp. 1-5 (Apr. 9, 2013).*
Chen, et al., "AHG9: On DPB operations in HEVC 3DV and scalable extensions", JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0270, Apr. 9, 2013, XP030114227, 5 pp.
Deshpande, "AHG9: On Signaling DPB Parameters and DPB Operation", JCT-VC Meeting; MPEG Meeting; Apr. 18, 2013-Apr. 26, 2013; Incheon; (Joint Collaborative Team on Video Coding of ISO/IEC JTC1/SC29/WG11 and ITU-T SG.16); URL:http://wftp3.itu.int/av-arch/jctvc-site/,, No. JCTVC-M0210, Apr. 9, 2013, XP030114167, 8 pp.
International Search Report and Written Opinion from International Application No. PCT/US2014/059925 dated Jan. 20, 2015, 12 pp.
Ramasubramonian A K., et al., "MV HEVC/SHVC HLS on DPB operations", 14. JCT-VC Meeting; Jul. 25, 2013-Aug. 2, 2013; Vienna; (Joint Collaborative Team on Video Coding of ISO/IEC JTC1/SC29/WG11 and ITU-T SG.16); URL:http://wftp3.itu.int/av-arch/jctvc-site/,, No. JCTVC-N0093, Jul. 16, 2013 , pp. 1-5, XP030114540.
Ramasubramonian, et al., "MV-HEVC/SHVC HLS: Sub-DPB based DPB operations", JCT-VC Meeting; Oct. 23, 2013-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-O0217, Oct. 15, 2013, pp. 1-4, XP030115266.
Ramasubramonian, et al., "MV-HEVC/SHVC HLS: DPB-related parameters in SPS and VPS", JCT-VC Meeting; Jul. 25, 2013-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/,, No. JCTVC-N0091, Jul. 16, 2013, XP030114537, 7 pp.
Wiegand et al., "WD1: Working Draft 1 of High-Efficiency Video Coding," JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011 (Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29/WG11 and ITU-T SG.16); JCTVC-F803_d2, Oct. 4, 2011, 226 pp.
Bross et al., "WD5: Working Draft 5 of High-Efficiency Video Coding," 7th Meeting: Geneva, CH, Nov. 21 through 30, 2011, (Joint Collaborative Team on Video Coding of ISO/IEC JTC1/SC29/WG11 and ITU-T SG.16); JCTVC-G1103_d2, Dec. 30, 2011, 214 pp.
Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High Efficiency Video Coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High Efficiency Video Coding (HEVC) text specification draft 10 (for FDIS & Last Call)," 12th Meeting: Geneva, CH, Jan. 14 through 23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen et al., "High Efficiency Video Coding (HEVC) scalable extension draft 3", 14th Meeting; Vienna, AT, Jul. 25 through Aug. 2, 2013 (Joint Collaborative Team on Video Coding of ISO/IEC JTC1/SC29/WG11 and ITU-T SG.16); JCTVC-N1008_v3, Sep. 16, 2013, 61 pp.
Tech et al., "MV-HEVC Draft Text 5", 5th Meeting; Vienna, AT, Jul. 27 through Aug. 2, 2013 (Joint Collaborative Team on Video Coding of ISO/IEC JTC1/SC29/WG11 and ITU-T SG.16); JCT3V-E1004-v6, Jan. 13, 2014 ,65 pp.
Wang et al., "High Efficiency Viedo Coding (HEVC) Defect Report", 14th Meeting, Vienna, AT, Jul. 25 through Aug. 2, 2013 (Joint Collaborative Team on Video Coding of ISO/IEC JTC1/SC29/WG11 and ITU-T SG.16); JCTVC-N1003_v1, Sep. 27, 2013, 311 pp.
Flynn et al., "High Efficiency Video Coding (HEVC) Range Extensions text specification: Draft 4", 13th Meeting, Incheon, KR, Apr. 18 though 26, 2013 (Joint Collaborative Team on Video Coding of ISO/IEC JTC1/SC29/WG11 and ITU-T SG.16); JCTVC-N1005_v1, Aug. 7, 2013, 322 pp.
Bross et al., "JCT-VC AHG report: HEVC Draft and Test Model Editing (AGH 2)", 8th Meeting, San Jose, CA, USA, Feb. 1 through 10, 2012, (Joint Collaborative Team on Video Coding of ISO/IEC JTC1/SC29/WG11 and ITU-T SG.16); JCTVC-H0002_v1, Feb. 1, 2012, 5 pp.
Tech et al., "MV-HEVC Draft Text 4", 4th Meeting, Incheon, KR, Apr. 20 through 23, 2013 (Joint Collaborative Team on Video Coding of ISO/IEC JTC1/SC29/WG11 and ITU-T SG.16); JCT3V-D1004_v3, Jan. 13, 2014, 67 pp.
Hannuksela et al. , "3d-AVC Draft Text 5" 4th meeting, Geneva, CH, Jan. 17 through 23, 2013 (Joint Collaborative Team on 3D Video Coding Extension Development of ITU-T SG 16 WP 3 and ISO/IEC JTC 1/SC 29/WG 11); JCT3V-C1001_V3, Jan. 13, 2014, 74 pp.
Hannuksela et al., "3D-AVC Draft Text 8," 6th Meeting, Geneva, CH, Oct. 25 though Nov. 1, 2013 (Joint Collaborative Team on 3D

(56) References Cited

OTHER PUBLICATIONS

Video Coding Extension Development of ITU-T SG 16 WP 3 and ISO/IEC JTC 1/SC 29/WG 11); JCT3V-F1002_v3, Jan. 13, 2014, 62 pp.

Tech et al, "MV-HEVC draft Text 6," 6th Meeting, Geneva, CH, Oct. 25 through Nov. 1, 2013 (Joint Collaborative Team on 3D Video Coding Extension Development of ITU-T SG 16 WP 3 and ISO/IEC JTC 1/SC 29/WG 11); JCT3V-F1004_v6, Jan. 13, 2014, 109 pp.

Tech et al., "MV-HEVC Draft Text 2", 6th Meeting, Geneva, CH, Oct. 25 through Nov. 1, 2013 (Joint Collaborative Team on 3D Video Coding Extension Development of ITU-T SG 16 WP 3 and ISO/IEC JTC 1/SC 29/WG 11); JCT3v-F1001_v2, Jan. 13, 2014, 93 pp.

Response to Written Opinion dated Aug. 10, 2015, from International Application No. PCT/US2014/059925, filed Aug. 10, 2015, 7 pp.

Second Written Opinion from International Application No. PCT/US2014/059925 dated Sep. 10, 2015, 6 pp.

Response to Second Written Opinion dated Sep. 10, 2015, from International Application No. PCT/US2014/059925, filed Nov. 9, 2015, 5 pp.

International Preliminary Report on Patentability from International Application No. PCT/US2014/059925 dated Feb. 2, 2016, 9 pp.

\* cited by examiner

SIGNALING FOR SUB-DECODED PICTURE BUFFER (SUB-DPB) BASED DPB OPERATIONS IN VIDEO CODING

This application claims the benefit of U.S. Provisional Application No. 61/889,515, filed Oct. 10, 2013, and U.S. Provisional Application No. 61/890,841, filed Oct. 14, 2013, the entire contents of each of which are incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes video coding techniques. In particular, the techniques are related to video coding and signaling techniques that may be applied to sub-decoded picture buffers (sub-DPBs). In one or more examples of the disclosure, techniques for signaling DPB and sub-DPB parameters for one or more layers and/or one or more sub-layers are described. By utilizing the techniques of the disclosure, signaling efficiency may be increased for multi-layer video bitstreams that include one or more sub-layers.

In one example of the disclosure, a method of decoding video data comprises receiving an encoded video bitstream that includes a plurality of pictures, storing the plurality of pictures in one or more sub-DPBs, receiving a respective set of sub-DPB parameters for each respective operation point of the encoded video bitstream, applying the respective set of sub-DPB parameters to all layers of an output layer set for each respective operation point, and performing a sub-DPB management process on the one or more sub-DPBs in accordance with the received respective single sets of sub-DPB parameters.

In another example of the disclosure, an apparatus configured to decode video data comprises one or more sub-DPBs configured to store video data, and a video decoder configured to receive an encoded video bitstream that includes a plurality of pictures, store the plurality of pictures in the one or more sub-DPBs, receive a respective set of sub-DPB parameters for each respective operation point of the encoded video bitstream, apply the respective set of sub-DPB parameters to all layers of an output layer set for each respective operation point, and perform a sub-DPB management process on the one or more sub-DPBs in accordance with the received respective single sets of sub-DPB parameters.

In another example of the disclosure, an apparatus configured to decode video data comprises means for receiving an encoded video bitstream that includes a plurality of pictures, means for storing the plurality of pictures in one or more sub-DPBs, means for receiving a respective set of sub-DPB parameters for each respective operation point of the encoded video bitstream, means for applying the respective set of sub-DPB parameters to all layers of an output layer set for each respective operation point, and means for performing a sub-DPB management process on the one or more sub-DPBs in accordance with the received respective single sets of sub-DPB parameters.

In another example this disclosure describes, a computer-readable storage medium storing instructions that, when executed, cause one or more processors of a device configured to decode video data to receive an encoded video bitstream that includes a plurality of pictures, store the plurality of pictures in the one or more sub-DPBs, receive a respective set of sub-DPB parameters for each respective operation point of the encoded video bitstream, apply the respective set of sub-DPB parameters to all layers of an output layer set for each respective operation point, and perform a sub-DPB management process on the one or more sub-DPBs in accordance with the received respective single sets of sub-DPB parameters.

In another example of the disclosure, a method of encoding video data comprises reconstructing a plurality of pictures of an encoded video bitstream, storing the plurality of pictures in one or more sub-DPBs, generating a respective set of sub-DPB parameters for each respective operation point of the encoded video bitstream, applying the respective set of sub-DPB parameters to all layers of an output layer set for each respective operation point, performing a sub-DPB management process on the one or more sub-DPBs in accordance with the generated respective single sets of sub-DPB parameters, and signaling the respective set of sub-DPB parameters in the encoded video bitstream.

In another example of the disclosure, an apparatus configured to encode video data comprises one or more sub-DPBs configured to store video data, and a video encoder configured to reconstruct a plurality of pictures of an encoded video bitstream, store the plurality of pictures in one or more sub-DPB, generate a respective set of sub-DPB parameters for each respective operation point of the encoded video bitstream, apply the respective set of sub-DPB parameters to all layers of an output layer set for each respective operation point, perform a sub-DPB management process on the one or more sub-DPBs in accordance with the generated respective single sets of sub-DPB parameters, and signal the respective set of sub-DPB parameters in the encoded video bitstream.

In another example of the disclosure, an apparatus configured to encode video data comprises means for reconstructing a plurality of pictures of an encoded video bitstream, means for storing the plurality of pictures in one or more sub-DPBs, means for generating a respective set of sub-DPB parameters for each respective operation point of the encoded video bitstream, means for applying the respective set of sub-DPB parameters to all layers of an output layer set for each respective operation point, means for performing a sub-DPB management process on the one or more sub-DPBs in accordance with the generated respective single sets of sub-DPB parameters, and means for signaling the respective set of sub-DPB parameters in the encoded video bitstream.

In another example, this disclosure describes a computer-readable storage medium storing instructions that, when executed, cause one or more processors of a device configured to encode video data to reconstruct a plurality of pictures of an encoded video bitstream store the plurality of pictures in one or more sub-DPBs, generate a respective set of sub-DPB parameters for each respective operation point of the encoded video bitstream, apply the respective set of sub-DPB parameters to all layers of an output layer set for each respective operation point, perform a sub-DPB management process on the one or more sub-DPBs in accordance with the generated respective single sets of sub-DPB parameters, and signal the respective set of sub-DPB parameters in the encoded video bitstream.

The details of one or more examples are set forth in the accompanying drawings and the description below. Other features, objects, and advantages will be apparent from the description and drawings, and from the claims.

DETAILED DESCRIPTION

Figure 1:
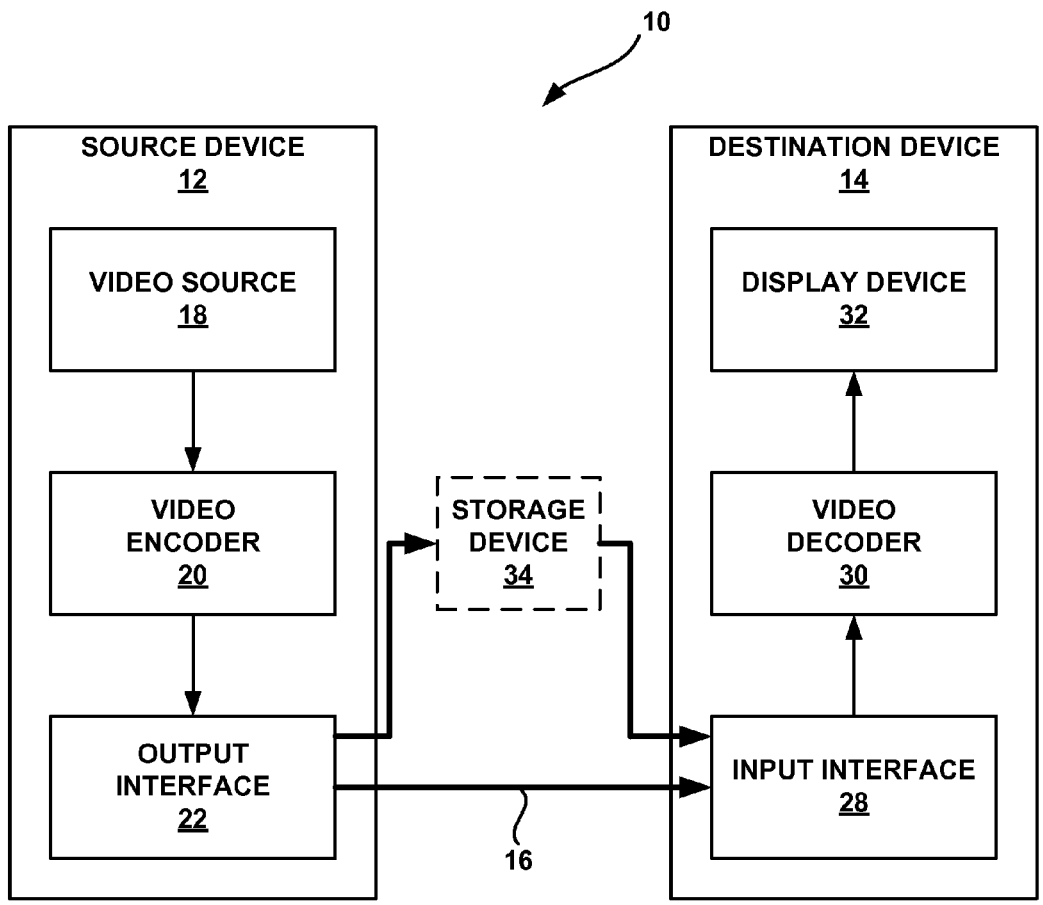
FIG. 1 is a block diagram illustrating an example video encoding and decoding system that may utilize the techniques described in this disclosure.

In general, this disclosure describes techniques for the signaling of parameters relating to decoded picture buffers (DPBs) in multi-layer video coding. In particular, this disclosure describes various techniques for signaling parameters relating the management of sub-units of a DPB (also called sub-DPBs). As will be described in more detail below, the techniques of this disclosure include techniques for signaling sub-DPB parameters for one or more layers and one or more sub-layers of a multi-layer video bitstream. By utilizing the techniques of the disclosure, signaling efficiency may be increased for multi-layer video bitstreams that include one or more sub-layers.

In the context of this disclosure, a layer may be a base layer or one or more enhancement layers in a scalable video coding process. Example scalable video coding processes include H.264/SVC (scalable video coding) and scalable extensions of the high efficiency video coding (HEVC) standard, such as Scalable HEVC (SHVC). In addition, a layer may refer to one or more texture views in multi-view or 3D video coding. In addition, a depth view in 3D video coding may also be considered a layer. As another example, a layer may correspond to a single view that includes both texture view components and depth view components. Example multi-view coding processes include H.264/MVC (multi-view coding) and multi-view extensions of the HEVC standard, such as multi-view HEVC (MV-HEVC). More generally, a layer may refer to a set of network abstraction layer (NAL) units that have the same layer identification (e.g., nuh_layer_id).

Thus, the term "layer" is generally used in this disclosure to refer to base and/or enhancement layers in the sense of scalable video coding, or views (including texture view components and/or depth view components) in the sense of 3D and multi-view video coding. Accordingly, the term multi-layer video coding generally refers to scalable video coding techniques, multi-view video coding techniques, and 3D video coding techniques, including multi-view plus depth coding. The techniques of this disclosure may apply to any such video coding scenarios, including multi-view extensions, 3D video extensions, and scalable extensions of HEVC and/or H.264/AVC.

In the context of this disclosure, the term "sub-layer" refers to a temporal scalable layer of a temporal scalable bitstream. That is, a bitstream in which one or more different sub-layers may be decoded to output video at different frame rates. A layer may include one or more sub-layers.

The techniques described below may be applied to scalable, multiview and 3D video coding techniques based on advanced codecs, including the coding of two or more views of a picture with depth maps. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely the High-Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG). The HEVC standard is described in ITU-T H.265, SERIES H: AUDIOVISUAL AND MULTIMEDIA SYSTEMS, Infrastructure of Audiovisual Services—Coding of Moving Video, "High Efficiency Video Coding," April 2013 (hereinafter, "HEVC").

Various extensions to HEVC have been proposed. One such extension is the HEVC Range Extension, described in "High Efficiency Video Coding (HEVC) Range Extensions text specification: Draft 4," JCTVC-N1005_v1, April 2013 (hereinafter, "JCTVC-N1005"). A recent Working Draft (WD) of the scalable HEVC (SHVC), standard, entitled "High efficiency video coding (HEVC) scalable extension draft 3," Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, and referred to as SHVC WD3 hereinafter, is available from http://phenix.it-sudparis.eu/jct/doc_end_user/documents/14_Vienna/wg11/JCTVC-N1008-v3.zip. A multiview extension to HEVC, namely MV-HEVC, is also being developed by the JCT-3V. One Working Draft of MV-HEVC (hereinafter WD4), is available from http://phenix.it-sudparis.eu/jct2/doc_end_user/documents/4_Incheon/wg11/JCT3V-D1004-v3.zip. A more recent working draft of MV-HEVC, titled "MV-HEVC Draft Text 8," Joint Collaborative Team on 3D Video Coding Extensions of ITU-T SG 16 WP3 and ISO/IEC JTC 1/SC 29/WG11, 8$^{th}$ Meeting: Valencia, ES, 29 Mar.-4 Apr. 2014, is available from http://phenix.it-sudparis.eu/jct3v/doc_end_user/documents/8_Valencia/wg11/JCT3V-H0002-v1.zip.

FIG. 1 is a block diagram illustrating an example video encoding and decoding system 10 that may utilize the techniques for decoded picture buffer (DPB) management and signaling in a multi-layer video coding process described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure for DPB management and signaling in a multi-layer video coding process, such as SHVC, MV-HEVC, or 3D-HEVC as examples, are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard, and may conform to the HEVC Test Model (HM). In particular, in some examples, video encoder 20 and video decoder may operate according to extensions of HEVC that support scalable, multiview, and/or multiview plus depth video coding. In other examples, video encoder 20 and video decoder 30 may operate according to other proprietary or industry standards, such as the ITU-T H.264 standard, alternatively referred to as MPEG-4, Part 10, Advanced Video Coding (AVC), or extensions of such standards, including H.264/SVC. The techniques of this disclosure, however, are not limited to any particular coding standard. Other examples of video compression standards include MPEG-2 and ITU-T H.263. In particular, in accordance with techniques of this disclosure, video encoder 20 and video decoder 30 may operate according to a video coding standard capable of scalable (e.g., SHVC) and/or multiview encoding (e.g., MV-HEVC or 3D-HEVC).

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The following section of the disclosure will provide a background of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM described that a video frame or picture may be divided into a sequence of treeblocks (also called coding tree blocks (CTBs) or largest coding units (LCUs)) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU generally corresponds to a size of the coding node and must typically be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector, which may be indicated by a prediction direction.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., CTB, LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data to which the transforms specified by TUs of the CU are applied. The residual data may correspond to pixel differences between pixels of the unencoded picture and prediction values corresponding to the CUs. Video encoder 20 may form the residual data for the CU, and then transform the residual data to produce transform coefficients.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive binary arithmetic coding (CABAC) or another entropy encoding methodology. To perform CABAC, video encoder 20 may assign a context within a context model to a symbol to be transmitted. The context may relate to, for example, whether neighboring values of the symbol are non-zero or not. Video encoder 20 may also entropy encode syntax elements associated with the encoded video data for use by video decoder 30 in decoding the video data.

HEVC extensions are also currently under development in JCT-3V and JCT-VC. In JCT-3V, two multiview-related HEVC extensions, the multiview extension (MV-HEVC) and 3D video extension (3D-HEVC) are being developed. In addition, two AVC extensions, the MVC+D and 3D-AVC are being developed.

Example versions of the ongoing standards are listed as follows:

T. Suzuki, M. M. Hannuksela, Y. Chen, S. Hattori, G. Sullivan, "MVC Extension for Inclusion of Depth Maps Draft Text 6," JCT3V-C1001, Joint Collaborative Team on 3D Video Coding Extension Development of ITU-T SG 16 WP 3 and ISO/IEC JTC 1/SC 29/WG 11, 4th meeting, available at http://phenix.int-evry.fr/jct2/doc_end_user/documents/3_Geneva/wg11/JCT3V-C1001-v3.zip.

M. M. Hannuksela, Y. Chen, T. Suzuki, J.-R. Ohm, G. Sullivan, "3D-AVC Draft Text 8," JCT3V-F1002, Joint Collaborative Team on 3D Video Coding Extension Development of ITU-T SG 16 WP 3 and ISO/IEC JTC 1/SC 29/WG 11, 6th Meeting, available at http://phenix.int-evey.fr/jct2/doc_end_user/documents/6_Geneva/wg11/JCT3V-F1002-v3.zip.

JCT3V-F1004, "MV-HEVC Draft Text 6," G. Tech, K. Wegner, Y. Chen, M. Hannuksela, Joint Collaborative Team on 3D Video Coding Extension Development of ITU-T SG 16 WP 3 and ISO/IEC JTC 1/SC 29/WG 11, 6th Meeting, available at http://phenix.int-evey.fr/jct2/doc_end_user/documents/6_Geneva/wg11/JCT3V-F1004-v6.zip.

Gerhard Tech, Krzysztof Wegner, Ying Chen, Sehoon Yea, "3D-HEVC Draft Text 2," JCT3V-F1001, Joint Collaborative Team on 3D Video Coding Extension Development of ITU-T SG 16 WP 3 and ISO/IEC JTC 1/SC 29/WG 11, 6th Meeting, available at http://phenix.int-evry.fr/jct2/doc_end_user/documents/6_Geneva/wg11/JCT3V-F1001-v2.

Multiview video coding techniques of extensions of the H.264/Advanced Video Coding (AVC) standard will now be discussed. However, the techniques of this disclosure may be applicable with any video coding standard that supports multiview coding and/or 3D coding multiview proposals for the emerging HEVC standard (e.g., MV-HEVC and 3D-HEVC).

Figure 2:
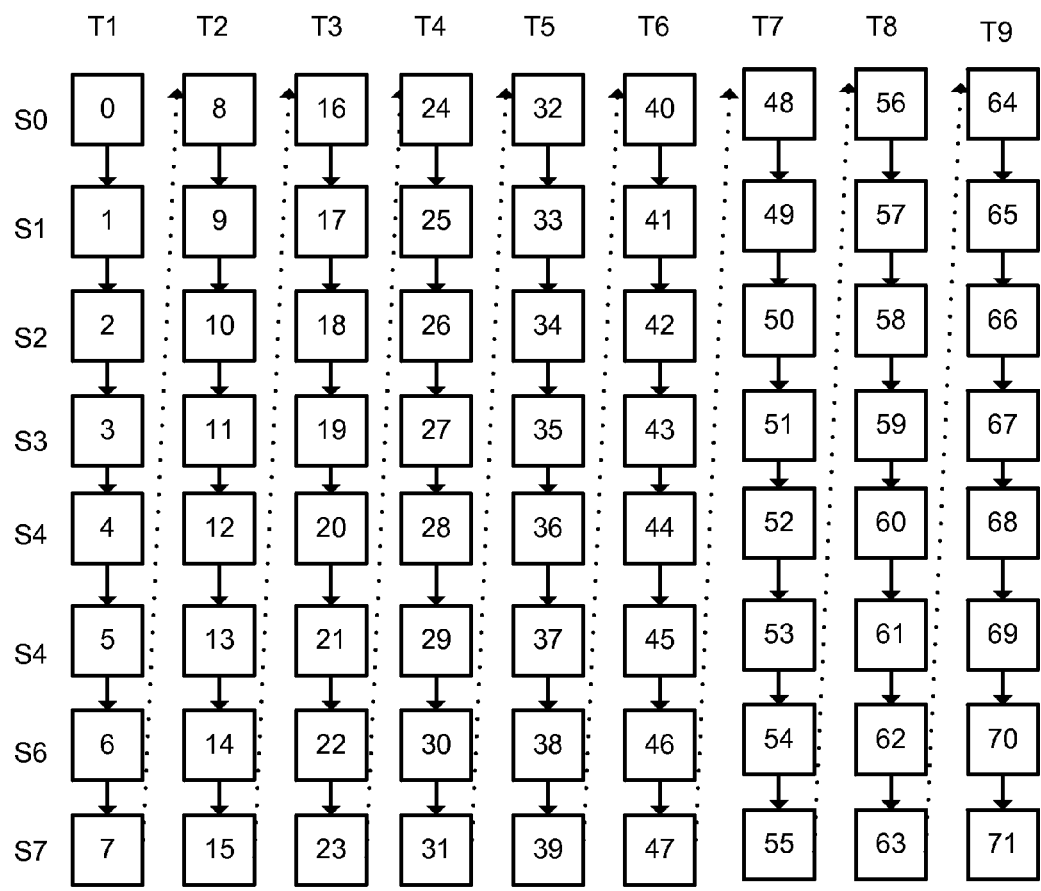
FIG. 2 is a conceptual diagram illustrating an example multiview decoding order.

Multiview video coding (MVC) is an extension of H.264/AVC. A typical MVC decoding order (i.e., a bitstream order) is shown in FIG. 2. The decoding order arrangement is referred as time-first coding. Note that the decoding order of access units may not be identical to the output order or display order of the access units. In FIG. 2, S0-S7 each refers to different views of the multiview video. T1-T9 each represents one output time instance. An access unit may include the coded pictures of all the views for one output time instance. For example, a first access unit may include all of the views S0-S7 for time instance T1, a second access unit may include all of the views S0-S7 for time instance T2, and so forth.

For purposes of brevity, the disclosure may use the following definitions:

view component: A coded representation of a view in a single access unit. When a view includes both a coded texture representation and a depth representation, a view component may include a texture view component and a depth view component.

texture view component: A coded representation of the texture of a view in a single access unit.

depth view component: A coded representation of the depth of a view in a single access unit.

As discussed above, in the context of this disclosure, each of a view component, texture view component, and a depth view component may be generally referred to as a layer. In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two types of pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as being part of a same view as the depth component in a single access unit.

The texture view component includes the actual image content that is displayed. For example, the texture view component may include luma (Y) and chroma (Cb and Cr) components. The depth view component may indicate relative depths of the pixels in the depth view component's corresponding texture view component. As one example, the depth view component is a gray scale image that includes only luma values. In other words, the depth view component may not convey any image content, but rather provide a measure of the relative depths of the pixels in the corresponding texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels, such that an increase in the darkness of the shade of gray of a pixel in the depth view is indicative of an increase in the level of depth associated with the corresponding pixel in the texture view. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose.

The depth view component using only luma values (e.g., intensity values) to identify depth is provided for illustration purposes and should not be considered limiting. In other examples, any technique may be utilized to indicate relative depths of the pixels in the texture view component.

Figure 3:
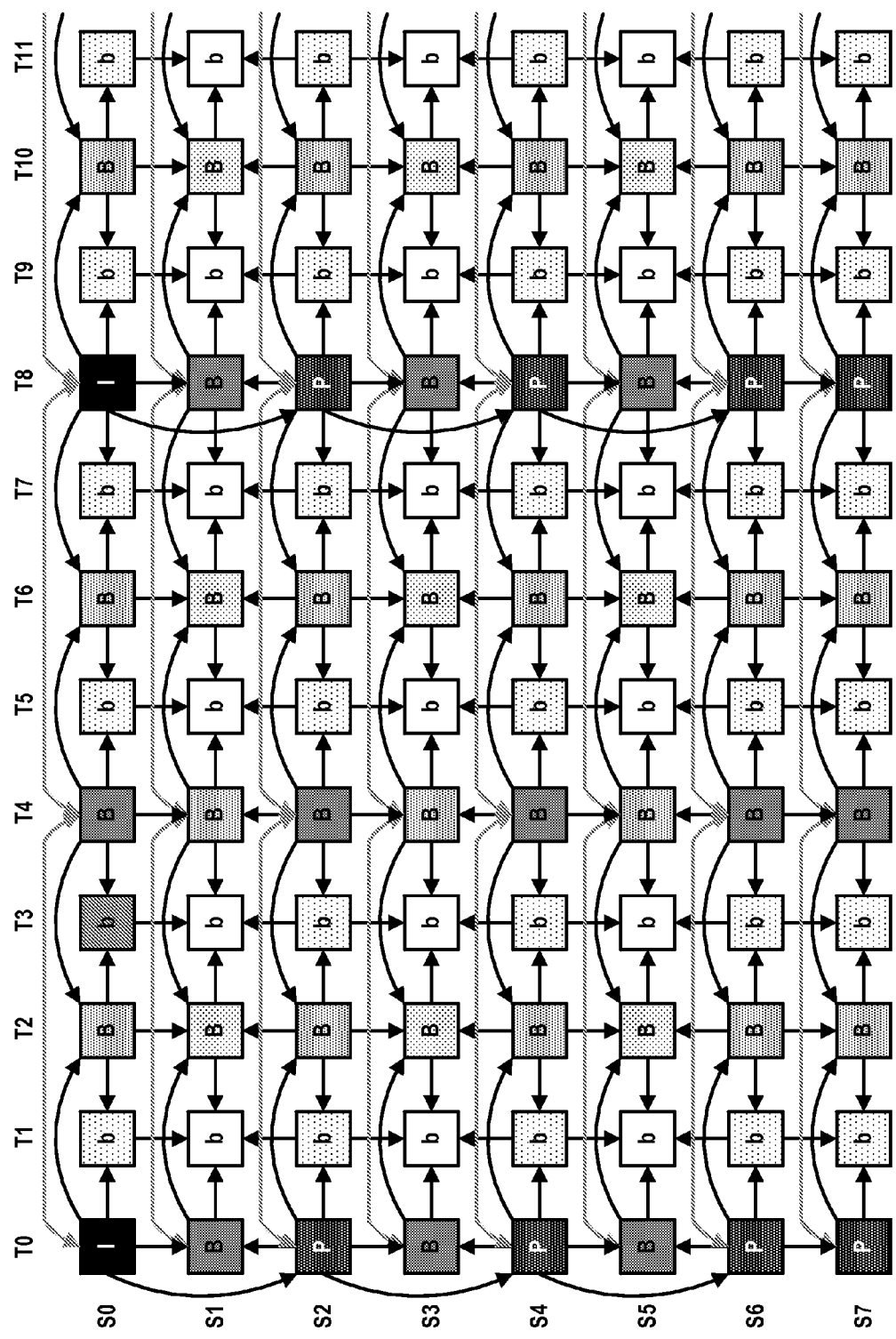
FIG. 3 is a conceptual diagram illustrating an example prediction structure for multiview coding.

A typical MVC prediction structure (including both inter-picture prediction within each view and inter-view prediction) for multi-view video coding is shown in FIG. 3. The prediction structure of FIG. 3 may also be used with MV-HEVC>Prediction directions are indicated by arrows, the pointed-to object using the pointed-from object as the prediction reference. In MVC, inter-view prediction is supported by disparity motion compensation, which uses the syntax of the H.264/AVC motion compensation, but allows a picture in a different view to be used as a reference picture.

In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location.

Although MVC has a so-called base view, which is decodable by H.264/AVC decoders, and stereo view pairs could be supported also by MVC, the advantage of MVC is that MVC can support an example that uses more than two views as a 3D video input and decodes this 3D video represented by the multiple views. A renderer of a client having an MVC decoder may expect 3D video content with multiple views.

Pictures in FIG. 3 are indicated at the intersection of each row and each column. The H.264/AVC standard may use the term frame to represent a portion of the video. This disclosure may use the term picture and frame interchangeably.

The pictures in FIG. 3 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from pictures for prediction reference. For example, the P-picture of view S2 at temporal location T0 is predicted from the I-picture of view S0 at temporal location T0.

As with single view video encoding, pictures of a multi-view video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Inter-view prediction is also a feature of a proposed multiview extension of HEVC, including 3D-HEVC (multiview plus depth).

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 3 may be viewed as illustrating the texture view components. For example, the I-, P-, B-, and b-pictures illustrated in FIG. 3 may be considered as texture view components for each of the views. In accordance with the techniques described in this disclosure, for each of the texture view components illustrated in FIG. 3 there is a corresponding depth view component. In some examples, the depth view components may be predicted in a manner similar to that illustrated in FIG. 3 for the corresponding texture view components.

Coding of two views may also be supported by MVC. One of the advantages of MVC is that an MVC encoder may take more than two views as a 3D video input and an MVC decoder may decode such a multiview representation. As such, any renderer with an MVC decoder may decode 3D video content with more than two views.

As discussed above, in MVC (or MV-HEVC), inter-view prediction is allowed among pictures in the same access unit (meaning, in some instances, with the same time instance). When coding a picture in one of the non-base views, a picture may be added into a reference picture list, if it is in a different view but within a same time instance. An inter-view prediction reference picture may be put in any position of a reference picture list, just like any inter-prediction reference picture. As shown in FIG. 3, a view component can use the view components in other views for reference. In MVC, inter-view prediction is realized as if the view component in another view was an inter-prediction reference.

As shown in FIG. 3, a view component can use the view components in other views for reference. This is called inter-view prediction. In MVC, inter-view prediction is realized as if the view component in another view was an inter prediction reference. The potential inter-view references, however, are signaled in the Sequence Parameter Set (SPS) MVC extension (as shown in Table 1 below) and can be modified by the reference picture list construction process, which enables flexible ordering of the inter prediction or inter-view prediction references.

TABLE 1

SPS MVC Extension Syntax Table

| | Descriptor |
|---|---|
| seq_parameter_set_mvc_extension( ) { | |
|     num_views_minus1 | ue(v) |
|     for( i = 0; i <= num_views_minus1; i++ ) | |
|         view_id[ i ] | ue(v) |

TABLE 1-continued

SPS MVC Extension Syntax Table

| | Descriptor |
|---|---|
|     for( i = 1; i <= num_views_minus1; i++ ) { | |
|         num_anchor_refs_l0[ i ] | ue(v) |
|         for( j = 0; j < num_anchor_refs_l0[ i ]; j++ ) | |
|             anchor_ref_l0[ i ][ j ] | ue(v) |
|         num_anchor_refs_l1[ i ] | ue(v) |
|         for( j = 0; j < num_anchor_refs_l1[ i ]; j++ ) | |
|             anchor_ref_l1[ i ][ j ] | ue(v) |
|     } | |
|     for( i = 1; i <= num_views_minus1; i++ ) { | |
|         num_non_anchor_refs_l0[ i ] | ue(v) |
|         for( j = 0; j < num_non_anchor_refs_l0[ i ]; j++ ) | |
|             non_anchor_ref_l0[ i ][ j ] | ue(v) |
|         num_non_anchor_refs_l1[ i ] | ue(v) |
|         for( j = 0; j < num_non_anchor_refs_l1[ i ]; j++ ) | |
|             non_anchor_ref_l1[ i ][ j ] | ue(v) |
|     } | |
|     num_level_values_signalled_minus1 | ue(v) |
|     for( i = 0; i <= num_level_values_signalled_minus1; i++ ) | |
|     { | |
|         level_idc[ i ] | u(8) |
|         num_applicable_ops_minus1[ i ] | ue(v) |
|         for(j = 0; j <= num_applicable_ops_minus1[ i ]; j++ ) { | |
|             applicable_op_temporal_id[ i ][ j ] | u(3) |
|             applicable_op_num_target_views_minus1[ i ][ j ] | ue(v) |
|             for( k = 0; k <= applicable_op_num_target_views_minus1[ i ][ j ]; k++ ) | |
|                 applicable_op_target_view_id[ i ][ j ][ k ] | ue(v) |
|             applicable_op_num_views_minus1[ i ][ j ] | ue(v) |
|         } | |
|     } | |
| } | |

In the SPS MVC extension, for each view, the number of views that can be used to form reference picture list 0 and reference picture list 1 are signaled. Prediction relationships for an anchor picture, as signaled in the SPS MVC extension, can be different from the prediction relationship for a non-anchor picture (signaled in the SPS MVC extension) of the same view.

The next section will discuss multi-view and 3D video coding with respect to HEVC. In particular, example techniques of this disclosure are applicable when coding two or more views. The plurality of video pictures for each view may be referred to as texture view components. For 3D-HEVC, each texture view component may have a corresponding depth view component. MV-HEVC does not use depth view components. The texture view components include video content (e.g., luma and chroma components of pixel values), and the depth view components (e.g., for 3D-HEVC) may indicate relative depths of the pixels within the texture view components.

Example techniques of this disclosure relate to coding 3D video data by coding texture data, or texture data and depth data. In general, the term "texture" is used to describe luminance (that is, brightness or "luma") values of an image and chrominance (that is, color or "chroma") values of the image. In some examples, a texture image may include one set of luminance data and two sets of chrominance data, for blue hues (Cb) and red hues (Cr). In certain chroma formats, such as 4:2:2 or 4:2:0, the chroma data is downsampled relative to the luma data. That is, the spatial resolution of chrominance components is lower than the spatial resolution of corresponding luminance components, e.g., one-half or one-quarter of the luminance resolution.

Depth data generally describes depth values for corresponding texture data. For example, a depth image may include a set of depth pixels that each describes depth for corresponding texture data. The depth data may be used to determine horizontal disparity for the corresponding texture data. Thus, a device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in a second view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to present a slight perception of depth, or may be displayed in different locations for the left and right eye (e.g., with horizontal disparity that is opposite that of pixels located in front of the zero disparity plane). Many other techniques may also be used to convey or define depth data for an image.

For each pixel in the depth view component, there may be one or more corresponding pixels in the texture view component. For instance, if the spatial resolutions of the depth view component and the texture view component are the same, each pixel in the depth view component corresponds to one pixel in the texture view component. If the spatial resolution of the depth view component is less than that of the texture view component, then each pixel in the depth view component corresponds to multiple pixels in the texture view component. The value of the pixel in the depth view component may indicate the relative depth of the corresponding one or more pixels in the texture view.

In some examples, a video encoder signals video data for the texture view components and the corresponding depth view components for each of the views. A video decoder utilizes both the video data of texture view components and the depth view components to decode the video content of the views for display. A display then displays the multiview video to produce 3D video.

Figure 4:
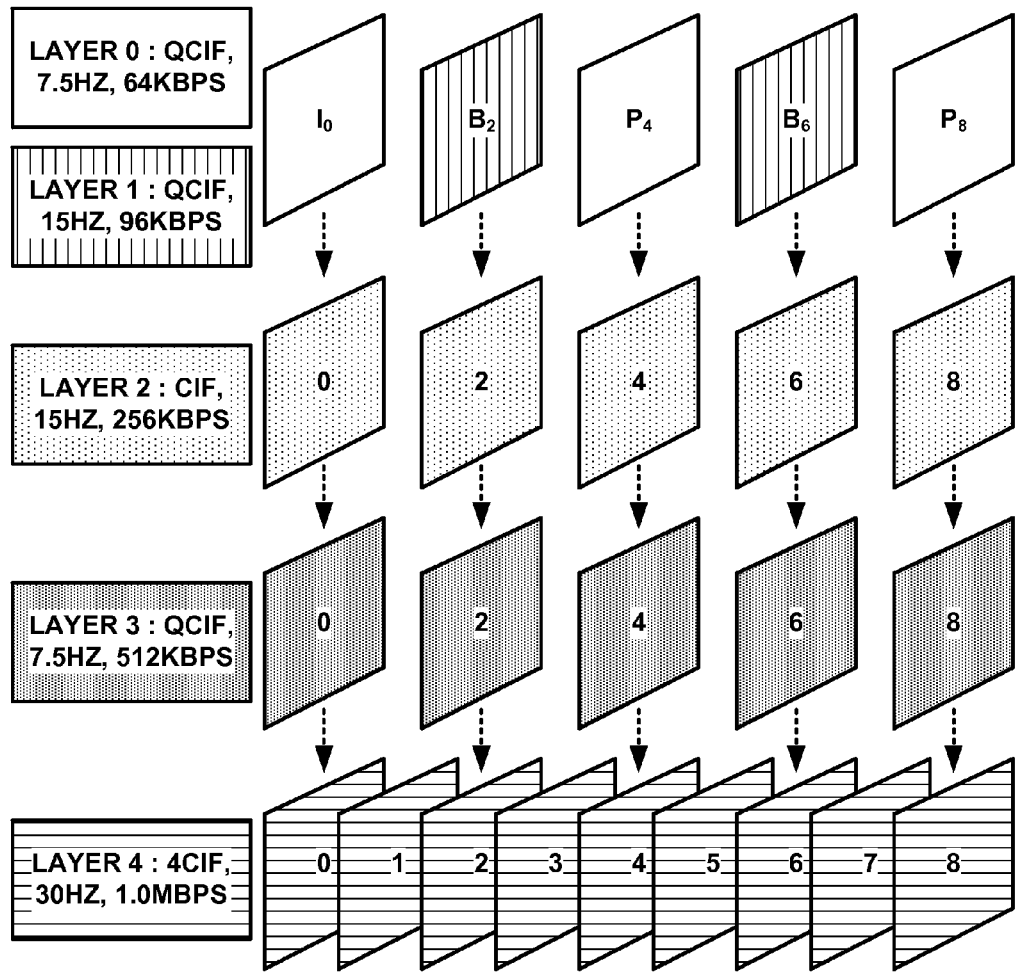
FIG. 4 is a conceptual diagram illustrating example scalable video coding layers.

Scalable extensions of HEVC are also being developed by JCT-VC. FIG. 4 is a conceptual diagram illustrating one example of scalable video coding. While FIG. 4 is described with respect to H.264/AVC and SVC, it should be understood that similar layers may be coded using other multi-layer video coding schemes, including scalable extension of HEVC. The example of FIG. 4 shows layers coded using the same codec. In other examples, layers may be coded using a multi-standard codec. For example, a base layer may be coded using H.264/AVC, while an enhancement layer may be coded using a scalable extension to HEVC. Thus, references to SVC below may apply to scalable video coding in general, and are not restricted to the scalable extension of H.264/AVC.

In SVC, scalabilities may be enabled in three dimensions including, for example, spatial, temporal, and quality (represented as a bit rate or signal to noise ratio (SNR)) dimensions. In general, better representation can be normally achieved by adding to a representation in any dimension. For example, in the example of FIG. 4, layer 0 is coded at Quarter Common Intermediate Format (QCIF) having a frame rate of 7.5 Hz and a bit rate of 64 kilobytes per second (KBPS). In addition, layer 1 is coded at QCIF having a frame rate of 15 Hz and a bit rate of 64 KBPS, layer 2 is coded at CIF having a frame rate of 15 Hz and a bit rate of 256 KBPS, layer 3 is coded at QCIF having a frame rate of 7.5 Hz and a bit rate of 512 KBPS, and layer 4 is coded at 4CIF having a frame rate of 30 Hz and a bit rate of Megabytes per second (MBPS). It should be understood that the particular number, contents and arrangement of the layers shown in FIG. 4 are provided for purposes of example only.

In any case, once a video encoder (such as video encoder 20) has encoded content in such a scalable way, a video decoder (such as video decoder 30) may use an extractor tool to adapt the actual delivered content according to application requirements, which may be dependent e.g., on the client or the transmission channel.

In SVC, pictures having the lowest spatial and quality layer are typically compatible with H.264/AVC. In the example of FIG. 4, pictures with the lowest spatial and quality layer (e.g., pictures in layer 0 and layer 1, with QCIF resolution) may be compatible with H.264/AVC. Among them, those pictures of the lowest temporal level form the temporal base layer (e.g., layer 0). This temporal base layer (e.g., layer 0) may be enhanced with pictures of higher temporal levels (e.g., layer 1).

In addition to the H.264/AVC compatible layer, several spatial and/or quality enhancement layers may be added to provide spatial and/or quality scalabilities. Each spatial or quality enhancement layer itself may be temporally scalable, with the same temporal scalability structure as the H.264/AVC compatible layer.

A described above, the term "layer" is generally used in this disclosure to refer to individual base layers or individual enhancement layers in the sense of scalable video coding, or texture views and/or depth views in the sense of 3D and multi-view video coding. Once pictures for each of the layers (e.g., MV-HEVC layers or SHVC layers), is decoded, e.g., by video decoder 30 or the reconstruction loop of video encoder 20, pictures for the decoded layer are stored in a DPB. A DPB is a buffer or memory that is used to store pictures, and within this disclosure, pictures of decoded layers when using multi-layer video coding techniques. The pictures of the decoded layers stored in the DPB may be used as references for inter-prediction (including motion compensation, inter-view and inter-layer prediction), for output reordering, and output delay.

In accordance with various examples of this disclosure, a DPB may be partitioned into sub-units (e.g., called sub-DPBs). Each sub-DPB may then be configured to store a picture(s), or more generally, picture information, for a particular layer type. For example, a DPB may be partitioned such that one sub-DPB is configured to store pictures of a base layer for a scalable video coding process. Another sub-DPB may be configured to store pictures of a first enhancement layer of a scalable video coding process. Yet another sub-DPB may be configured to store pictures of a second enhancement layer of a scalable video coding process, and so on.

In accordance with various example of this disclosure, as will be described in more detail below, video encoder 20 may also be configured to manage each sub-DPB independently of one another, such as in terms of marking pictures for removal from the DPB, removal of the decoded picture from the DPB, as well as the allocation of size for each sub-DPB. However, video encoder 20 may link the output of decoded pictures from different sub-DPBs, e.g., based on the respective output times and/or picture order count (POC) values associated with each decoded picture.

One or both of video encoder 20 and video decoder 30 (and/or one or more components thereof) may implement multiple different modes of sub-DPB based operations. For example, two modes of sub-DPB based operation may differ in terms of the manner in which pictures are associated with each sub-DPB. According to the first mode (referred to herein as "layer-specific mode"), each layer in the operation point may be associated with a separate sub-DPB, and the number of sub-DPBs may be equal to the number of layers in the layer set corresponding to the operation point. According to a second mode (referred to herein as "resolution-specific mode"), all pictures that share the same resolution, chroma format, and bit depth share the same sub-DPB. Video encoder 20 may specify layer-specific mode relatively easily. However, layer-specific mode may be less efficient in terms of DPB memory usage, when compared to resolution-specific mode.

Figure 5:
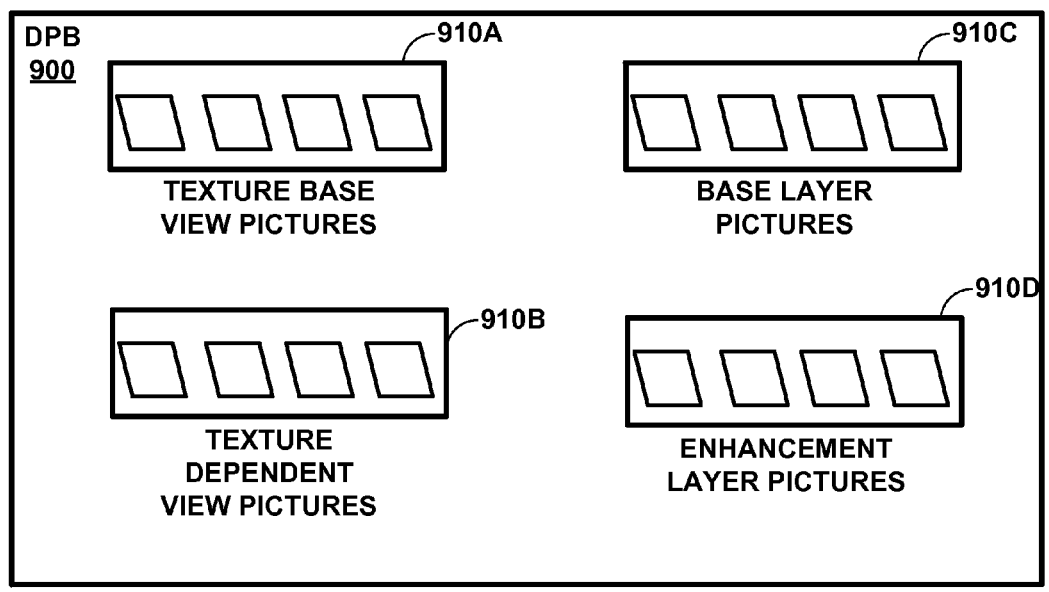
FIG. 5 is a conceptual diagram showing an example decoded picture buffer (DPB) according to examples of the disclosure.

FIG. 5 is a conceptual diagram showing DPB 900 that is configured to store different decoded layer components (e.g., pictures for different layer types) in different sub-units. DPB 900 may form part of a video decoder and/or video encoder (e.g., video encoder 20 and video decoder 30). Each of sub-DPBs 910A-910D represents storage locations for picture(s) of different types of decoded layers. For example, sub-DPB 910A may be configured to store one or more texture pictures of a base view for an MV-HEVC compatible video bitstream, while sub-DPB 910B may be used for storing texture pictures of a dependent view for the MV-HEVC compatible video bitstream. Similarly, sub-DPB 910C may be used for storing pictures of a base layer in a scalable video coding process (e.g., SHVC), while sub-DPB 910D may be used for storing one level of pictures for an enhancement layer in the scalable video coding process. Additional sub-DPBs may be configured to store pictures of additional levels of enhancement layer or pictures of additional texture dependent views. Each of sub-DPBs 910A-D contains separate units that are configured to store one or more pictures of a decoded layer for the particular layer type associated with the sub-DPB. It should be noted that video data coded with MV-HEVC and video data coded with SHVC is not necessarily decoded at the same time. That is, SHVC and MV-HEVC coded video data are not typically in the same encoded video bitstream, but rather, are typically coded separately.

Video decoder 30 may be further configured to remove pictures of decoded layers from the plurality of sub-DPBs 910A-D. In some examples, the removal of pictures from each given sub-DPB (e.g., sub-DPB 910A) may be managed separately (i.e., pictures may be removed from one sub-DPB independently from the removal of other pictures from other sub-DPBs). In other examples, pictures may be removed from one or more sub-DPBs based on an operation point. A particular operation point is associated with a particular number of layers that are decoded for a particular picture to be output. For example, for SHVC, one operation point may only require a picture of a base layer to be decoded. In another operation point for SHVC, a picture of a base layer and pictures of one or more enhancement layers may be decoded to produce an output picture. In the operation point requiring both a picture of a base layer and pictures of one or more enhancement layers, removal of pictures may be performed for every sub-DPB used for that operation point (i.e., every sub-DPB which stores pictures for a layer that is used for the picture to be output). That is, a picture of a base layer and the corresponding pictures of the one or more enhancement layers associated with a given operation point may be removed from their respective sub-DPBs at the same time.

Video encoder 20 and video decoder 30 may be further configured to mark decoded layer components (e.g., pictures of layers) as unused for reference or used for reference in the plurality of sub-DPBs 910A-D. Again, the process for marking pictures as unused for reference may be performed separately for each sub-DPB. That is, video encoder 20 and video decoder 30 may be configured to perform a marking process on the pictures in each of the plurality of sub-DPBs independently, wherein the marking process marks pictures as used for reference or marks the pictures as unused for reference. In another example, the marking process may be performed for all sub-DPBs storing pictures for a particular number of layers related to a particular operation point.

In HEVC, and other video coding standards, the operation of DPB 900 is often specified in relation to a hypothetical reference decoder (HRD). Video encoder 20 and video decoder 30 may be configured to manage DPB 900 to perform various actions, including marking decoded pictures stored in DPB 900 as "unused for reference" (i.e., unable to be used as a reference picture for an inter prediction process), marking a decoded picture for output (e.g., to display device 32) and marking a decoded picture for removal from DPB 900 (also known as "bumping"). In HEVC, the bumping process includes both marking a picture for output and marking a picture for removal. A picture is typically removed (i.e., bumped) from DPB 900 when the picture is no longer needed as a reference picture for inter-prediction and no longer needed for output.

The conformance of bitstreams is specified by defining the behavior of the HRD. DPB 900 may be considered to be a component of the HRD. As described above, DPB 900 may be implemented as one or more memory units configured to store reconstructed pictures in a video encoder (e.g., video encoder 20) or decoded pictures in a video decoder (e.g., video decoder 30). In some proposals for SHVC and MV-HEVC, DPB operations are not clearly specified, but a simple assumption is that all pictures with the same output time arrive in DPB 900 (i.e., are stored in DPB 900) at the same time instant. The output of pictures from DPB 900 is determined based on how HRD parameters are defined.

For example, HRD parameters may be defined for output order conformance. As one example, the output order of decoded layer pictures may be specified by one or more syntax elements whose value specifies the number of pictures present for a particular layer. As another example, for output time conformance, the output time may be specified by one or more syntax elements whose values indicate picture output times. Video decoder 30 may be configured to derive HRD settings from the values of parameters signaled in an encoded video bitstream. The HRD parameters may be signaled in a data format structure (e.g., called hrd_parameters( )). Example parameters may include a buffering period supplemental enhancement information (SEI) message and a picture timing SEI message. In some examples, a decoding unit (DU) information SEI message may also be defined. In some examples, the output of the pictures in DPB 900 occurs such that all pictures associated with the same output time are output at the same instant. In examples of this disclosure, pictures in different sub-DPBs may be output at the same time in the case that each of those pictures (i.e., the pictures in the different sub-DPBs) is associated with the same output time.

In some example proposals for HEVC, parameters that are related to DPB operations are signaled in one or more of a sequence parameter set (SPS) and/or a video parameter set (VPS). An SPS is a syntax structure that contains syntax elements that apply to zero or more entire coded video sequences (CVSs) as indicated by the values of syntax elements found in a picture parameter set (PPS) and/or a slice header. A VPS is a syntax structure containing syntax element that applies to zero or more entire CVSs as determined by the value of syntax element found in an SPS, PPS, and/or slice header. In general, syntax elements signaled in a VPS will apply to a greater number of pictures than the number of pictures to which syntax element signaled in an SPS apply. As defined in HEVC, a CVS is a sequence of access units that consists, in decoding order, of an access unit (AU) containing an intra random access picture (IRAP) associated with a nuh_layer_id equal to a value of 0 and with a NoRaslOutputFlag equal to a value of 1 followed by zero or more other Ails until the next AU (i.e., up to, but no including the next AU), in decoding order, containing an IRAP picture with nuh_layer_id equal to a value of 0 and NoRaslOutputFlag equal to a value of 1. An access unit is a set of network abstraction layer (NAL) units that are consecutive in decoding order and contain one or more coded pictures that each have the same output time.

Example syntax elements that are related to DPB operations include, but are not limited to, the max_dec_pic_buffering_minus1 syntax element, the max_num_reorder_pics syntax element, and the max_latency_increase_plus1 syntax element, which may each be signaled in the SPS and/or in the VPS. The max_dec_pic_buffering_minus1 syntax element, the max_num_reorder_pics syntax element, and the max_latency_increase_plus1 syntax element may be collectively referred to as the DPB parameters and/or the sub-DPB parameters.

The value of the max_dec_pic_buffering_minus1 syntax element specifies the maximum allowed size of a DPB or sub-DPB for a CVS in units of picture buffers. That is, a DPB or sub-DPB may be partitioned into one or more picture buffers, where each picture buffer stores a picture (e.g., a picture associated with a particular layer). In some examples, the value of max_dec_pic_buffering_minus1 is limited to a range of from 0 to some pre-determined maximum DPB and/or sub-DPB size.

The value of the max_num_reorder_pics syntax element specifies the maximum allowed number of pictures that may be stored in a DPB and/or sub-DPB and that can precede any picture in the CVS in decoding order and follow that same picture in output order. The value of the max_latency_increase_plus1 syntax element, when not equal to zero (i.e., based on the value of the max_latency_increase_plus1 syntax element being a value other than zero), is an indication of latency time that is used to determine the maximum number of pictures that may be stored in a DPB and/or sub-DPB that can precede any picture in the CVS in output order and follow that same picture in decoding order. If the number of pictures in a DPB and/or sub-DPB exceeds the maximum number of pictures indicated by the value of the max_num_reorder_pics syntax element or the value determined from the value of the max_latency_increase_plus1 syntax element, one or more pictures must be removed from the DPB and/or the sub-DPB.

In one example, video encoder 20 may be configured to generate and signal the aforementioned DPB parameters and/or sub-DPB parameters for each sub-layer, for example, if (i.e., based on) the value of a gating syntax element (e.g., the sub_layer_ordering_info_present_flag) is equal to 1. As described above, a sub-layer is a temporal scalable layer of a temporal scalable bitstream. According to this example, when sub-layer signaling is not allowed, only one value is signaled for each of the syntax elements, and the signaled values of each of these sub-DPB parameter syntax elements (i.e., the max_dec_pic_buffering_minus1 syntax element, the max_num_reorder_pics syntax element, and the max_latency_increase_plus1 syntax element) are inferred (i.e., determined without the receipt of explicit signaling) to be the same for all temporal sub-layers. Otherwise, when sub-layer signaling is allowed (e.g., the value of syntax element sub_layer_ordering_info_present_flag is equal to 0), the values of the sub-DPB parameter syntax elements are explicitly signaled for each sub-layer. The signaling of the sub-DPB parameters in the SPS is highlighted in Table 2 below in italics. Similar signaling may be used in the VPS.

TABLE 2

DPB Parameters in the SPS

|  | Descriptor |
|---|---|
| seq_parameter_set_rbsp( ) { | |
|   sps_video_parameter_set_id | u(4) |
|   if( nuh_layer_id == 0 ) { | |
|     sps_max_sub_layers_minus1 | u(3) |
|     sps_temporal_id_nesting_flag | u(1) |
|     profile_tier_level( 1, sps_max_sub_layers_minus1 ) | |
|   } | |
|   sps_seq_parameter_set_id | ue(v) |
|   chroma_format_idc | ue(v) |
|   if( chroma_format_idc == 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   *sps_sub_layer_ordering_info_present_flag* | *u(1)* |
|   *for( i = ( sps_sub_layer_ordering_info_present_flag* | |
| *? 0 : sps_max_sub_layers_minus1 );* | |
|     *i <= sps_max_sub_layers_minus1; i++ ) {* | |
|     *sps_max_dec_pic_buffering_minus1[ i ]* | *ue(v)* |
|     *sps_max_num_reorder_pics[ i ]* | *ue(v)* |
|     *sps_max_latency_increase_plus1[ i ]* | *ue(v)* |
|   } | |
| ... | |

In the base version of HEVC (sometimes called HEVC 1), only a single layer is present (e.g., as indicated by syntax element nuh_layer_id having a value equal to 0), and therefore, the layer set decoded and the layer set output are the same. In the context of multi-layer video coding (e.g., SHVC or MV-HEVC), the number of layer sets and output layers sets are not necessarily the same, as the total number of layer sets may not all be output for every operation point. That is, SHVC operation points often include the decoding of a base layer and one or more enhancement layers. Similarly, MV-HEVC operation points often include the decoding of two or more views. However, not all layers or views may be used to output a given picture.

Techniques for the removal of pictures from the DPB will now be discussed. Examples techniques for HEVC involve two ways of specifying the removal of pictures from the DPB. They include a picture-based DPB removal process and an AU-based DPB removal process. In a picture-based DPB removal process, pictures in one AU may be individually removed at different times. In AU-based DPB removal operations, all pictures in the AU are removed at the same time. Current proposals for DPB removal operations for SHVC and MV-HEVC do not clearly specify how pictures are to be removed.

Previous proposals for signaling DPB parameters, including parameters for sub-DPB operations (i.e., sub-DPB parameters), such as those proposed in Ramasubramonian, et al., "MV-HEVC/SHVC HLS: On DPB Operations," Joint Collaborative Team on 3D Video Coding Extensions of ITU-T SG 16 WP 3 and ISO/IEC JTC 1/SC 29/WG 11, 5th Meeting: Vienna, AT, 27 Jul.-2 Aug. 2013 (hereinafter, "JCTVC-N0093_v4) may be sub-optimal. As an example, according to the signaling scheme for sub-DPB based operations in JCTVC-N0093_v4, the three parameters related to DPBs and sub-DPBs (i.e., the max_dec_pic_buffering_minus1 syntax element, the max_num_reorder_pics syntax element, and the max_latency_increase_plus1 syntax element described above) are signaled for each output layer set, each layer in the output layer set, and for each temporal sub-layer within each layer. Such a signaling scheme may be sub-optimal.

In particular, signaling syntax elements that indicate the maximum number of reorder pictures and the maximum latency for each layer in each output layer set may be redundant, potentially causing wastage of computing resources (e.g., processor resources, storage capacity, etc.) and/or network bandwidth. For example, the output of one or more pictures of an output layer set in an access unit (AU) may be simultaneous. Furthermore, outputting pictures from a second AU before all pictures in a first AU are output may be disallowed. Therefore, signaling sub-DPB parameters for each layer in an output layer set may be redundant, as different values for sub-DPB parameters may not be possible. As such, it may be redundant to send reorder and/or latency information for each layer in an output layer set.

To mitigate or eliminate inefficiencies and other potential issues caused by such redundancy of signalled data, video encoder 20 and/or video decoder 30 may implement one or more of the techniques described herein. In one or more examples of the disclosure, video encoder 20 may be configured to signal one set of sub-DPB parameters for each output layer set corresponding to an operation point. The single set of sub-DPB parameters signalled for each output layer set is then used by video decoder 30 for every respective layer in each output layer set. In this way, signaling efficiency is increased, as redundant signaling of sub-DPB parameters is avoided. In addition, the values of the sub-DPB parameters may be harmonized across all layers of an output layer set.

In one example of the disclosure, for the output layer set of each operation point, video encoder 20 may be configured to generate and signal, in the VPS, only one value (i.e., a single value) of a syntax element indicative of the maximum number of reorder pictures and only one value (i.e., a single value) a syntax element indicative of the maximum latency. That is, for each operation point relating to a particular VPS, video encoder 20 generates one maximum number of reorder pictures syntax element and one maximum latency syntax element. Accordingly, the total number of reorder pictures syntax elements and maximum latency syntax elements in each VPS is dependent on the number of operation points defined for the video bitstream. As such, fewer instances of reorder pictures syntax elements and maximum latency syntax elements are signaled compared to previous proposals to HEVC where the reorder pictures syntax elements and maximum latency syntax elements are signaled for each output layer set, each layer in the output layer set, and for each temporal sub-layer within each layer.

As will be described in more detail below with reference to the first example implementation, the syntax element indicative of the maximum number of reorder pictures and the syntax element indicative of the maximum latency may be signaled in a DPB size table and may be transmitted in a VPS. In other examples of the disclosure, the syntax element indicative of the maximum number of reorder pictures and the syntax element indicative of the maximum latency may transmitted in other data structures including a PPS.

Upon receipt of the syntax element indicative of the maximum number of reorder pictures and the syntax element indicative of the maximum latency, video decoder 30 may apply the respective values of the syntax elements indicative of the maximum number of reorder pictures and indicative of the maximum latency to the output layer set for a particular operation point.

In one example, the syntax elements indicative of the maximum number of reorder pictures and indicative of the maximum latency may correspond to only one layer of an output layer. For example, the syntax elements may correspond to the layer having a highest layer id (e.g., as indicated by the nuh_layer_id syntax element). In this example, video encoder 20 may be configured to signal a flag to indicate to video decoder 30 whether the one value of the maximum number of reorder pictures and the one value of the maximum latency are associated with the layer with the largest value of nuh_layer_id in the operation point. Video decoder 30 would be configured to infer the value of the syntax elements for the output layer set to be same as the value received for the layer having the highest layer id.

In another example of the disclosure, video encoder 20 may signal an id value (e.g., using the nuh_layer_id syntax element) to indicate to video decoder 30 the layer with which the one value of the maximum number of reorder pictures and the one value of the maximum latency are associated. Again, video decoder 30 would be configured to infer the value of the syntax elements for the output layer set to be same as the value received for the layer having the highest layer id.

In another example of the disclosure, for each operation point, video encoder 20 may be configured to signal a flag to indicate to video decoder 30 whether the sub-DPB parameters (e.g., a syntax element indicating the maximum number of reorder pictures and/or a syntax element indicating the maximum latency) is only signaled for the layer with the largest value of nuh_layer_id in the output layer set (i.e., the highest layer), or that the sub-DPB parameters are signaled for each layer in the output layer set. If the value of the flag indicates that the sub-DPB parameters are only signaled for the highest layer, video decoder 30 may be configured to infer the value of the sub-DPB parameters for the output layer set to be the same value as the sub-DPB parameters for the highest layer.

In another example of the disclosure, for each output layer set, video encoder 20 may signal a flag to specify to video decoder 30 whether the sub-DPB parameters (e.g., syntax elements indicative of sub-DPB size, the maximum number of reorder pictures, and/or the maximum latency) are signaled for only one sub-layer (e.g., the sub-layer with temporal ID equal to 0) or for more than one sub-layer. For instance, video encoder 20 may generate the flag to a first value to indicate that the sub-DPB parameters information are signalled for only one sub-layer. In this case, video decoder 30 would then infer the value of the sub-DPB parameters for all other sub-layers to be same value as the sub-DPB parameters actually signaled for the one sub-layer (e.g., the sub-layer with temporal ID equal to 0).

Conversely, video encoder 20 may set the flag to a second value to indicate that the sub-DPB parameters may be signaled for multiple sub-layers. In one example, when the value of the flag indicates (i.e., based on the flag indicating) that sub-DPB parameters may be signaled for multiple sub-layers, video encoder 20 may be configured to generate syntax elements for the sub-DPB parameters for every sub-layer of an output layer set. In another example, as will be explained in more detail below with reference to Tables 3 and 4, video encoder 20 may be configured to generate a second flag that indicates, for each sub-layer of the output layer set, whether or not additional sub-DPB parameters are signaled for a particular sub-layer. When the second flag indicates that additional sub-DPB parameters are to be signaled for a particular sub-layer, video encoder 20 generates and signals the additional sub-DPB parameters for the particular sub-layer. If the second flag indicates that no additional sub-DPB parameters will be signaled for a particular sub-layer, video decoder 30 may be configured to infer the values of the sub-DPB parameters for the particular sub-layer from previously signaled sub-DPB parameters for the output layer set (e.g., from the sub-DPB parameters for the sub-layer having a temporal ID equal to 0, or from the sub-DPB parameters for the previous sub-layer). In some examples, when the second flag indicates that the sub-DPB parameters are not signaled for a particular sub-layer, the sub-DPB parameters of the sub-layers subsequent to that particular sub-layer are also not signalled, and video decoder 30 may be configured to infer the value of the sub-DPB parameters for those subsequent sub-layers from previously signaled sub-DPB parameters for the output layer set.

Video decoder 30 may be further configured to perform a sub-DPB management process (e.g., marking pictures for output, marking pictures as unused for reference, outputting pictures, and/or removing pictures) in accordance with sub-DPB parameter signaling techniques of this disclosure. For example, video decoder 30 may be configured to perform the bumping process on an access unit level, rather than on a picture level. This is because, according to the techniques of this disclosure, the sub-DPB parameters apply to an entire output layer set and not just a subset of the layers. Also in this regard, the necessity of checking the values of sub-DPB parameters for particular layer IDs is removed, as every layer of a particular output layer set shares the same sub-DPB parameters. More details of DPB management processes according to the techniques of this disclosure are described below with reference to the first example implementation.

The following techniques are additional examples of signaling techniques for signaling the sub-DPB parameters. In one example, for each operation point, video encoder 20 may signal a flag to specify to video decoder 30 whether the sub-DPB parameters are signaled. Alternatively, video decoder 30 may infer a value of the flag, in instances where video encoder 20 does not signal the flag. In another example, for each operation point, video encoder 20 may signal a flag to indicate to video decoder 30 whether: a) the sub-DPB sizes are only signaled for the sub-DPB of the highest index and for the other sub-DPBs inferred to be equal to the size of the sub-DPB with the highest index, or b) the sub-DPB sizes are signaled for each sub-DPB in the operation point.

The following sections describe example implementations of the techniques of this disclosure with respect to HEVC coding techniques. The example implementations will be described using the terminology and definitions of the HEVC, SHVC, MV-HEVC, and/or 3D-HEVC specifications. The definitions of any terms not explicitly defined below may be found in the HEVC, SHVC, MV-HEVC, and/or 3D-HEVC specifications, as reference above.

In a first example implementation of the techniques described herein, techniques for signaling DPB and sub-DPB parameters are described. Example syntax elements associated with the first example implementation are shown in Table 3 and Table 4 below. The syntax elements related to the techniques of this disclosure are distinguished in Table 3 and Table 4 through bolding and underlining. Deletions to previous HEVC contributions are shown with a strikethrough. The underlined portions of Table 1 and Table 2 are directed to changes introduced by Example Implementation #1 to existing syntax.

TABLE 3

| Video parameter set extension syntax | |
|---|---|
|  | Descriptor |
| vps_extension( ) { |  |
|   avc_base_layer_flag | u(1) |
|   ... |  |
|   cross_layer_irap_aligned_flag | u(1) |
|   dpb_size_table( ) |  |
|   direct_dep_type_len_minus2 | ue(v) |
|   .... |  |
| } |  |

As shown in Table 3, video encoder 20 may be configured to signal a DPB size table (dpb_size_table( )) in a VPS extension syntax. The DPB size table may include DPB and sub-DPB related parameters, including syntax elements having values indicative of sub-DPB size, the maximum number of reorder pictures, and/or the maximum latency (the sub-DPB parameters).

TABLE 4

DPB size table syntax

```
dpb_size_table( ) {
        for( i = 1; i < NumOutputLayerSets; i++ ) {
                sub_layer_flag_info_present_flag[ i ]                        u(1)
                for( j = 0; j <= vps_max_sub_layers_minus1; j++ ) {
                if( j > 0 && sub_layer_flag_info_present_flag[ i ] &&
                        sub_layer_dpb_info_present_flag[ i ][ j − 1 ] )
                        sub_layer_dpb_info_present_flag[ i ][ j ]            u(1)
                        if( sub_layer_dpb_info_present_flag[ i ][ j ] ) {
                                for( k = 0; k < NumSubDpbs[ i ]; k++ )
                        max_vps_dec_pic_buffering_minus1[ i ][ k ][ j ]     ue(v)
                        max_vps_num_reorder_pics[ i ][ j ]                   ue(v)
                        max_vps_latency_increase_plus1[ i ][ j ]             ue(v)
                }
            }
        }
    }
```

As shown in Table 4, video encoder 20 is configured to signal a DPB size table that includes syntax elements whose values specify a sub-DPB size (max_vps_dec_pic_buffering_minus1[i][k][j]), the maximum number of reorder pictures (max_vps_num_reorder_pics[i][j]), and the maximum sub-DPB latency (max_vps_latency_increase_plus1[i][j]). The for loop "for(i=1; i<NumOutputLayerSets; i++)" specifies that the sub-DPB size, maximum number of reorder pictures, and maximum sub-DPB latency is signalled for each output layer set i (i.e., for each operation point) up to the maximum number of output layer sets (NumOutputLayerSets). Accordingly, video decoder 30 is configured to apply the received maximum sub-DPB size, maximum number of reorder pictures, and maximum sub-DPB latency for every layer in an output layer set of an operation point.

Furthermore, as shown in Table 4, video encoder 20 may also be configured to generate and signal a flag (sub_layer_flag_info_present_flag[i]) that indicates whether the signaled values indicative of maximum sub-DPB size, maximum number of reorder pictures, and maximum sub-DPB latency are signalled for only one sub-layer of each layer, or for more than one sub-layer of a layer. For example, if the value of sub_layer_flag_info_present_flag[i] is 1, the values of the syntax elements indicating the maximum sub-DPB size, maximum number of reorder pictures, and maximum sub-DPB latency will be used for every sub-layer. However, if the value of sub_layer_flag_info_present_flag[i] is 0, separate syntax elements whose values indicate the maximum sub-DPB size, maximum number of reorder pictures, and maximum sub-DPB latency may be signalled for more than one sub-layer. In this example, video decoder 30, based on the value of the respective syntax elements, may be configured to use different values for the maximum sub-DPB size, maximum number of reorder pictures, and maximum sub-DPB latency for two or more different sub-layers.

In the case that the value of the sub_layer_flag_info_present_flag[i] is 1 (indicating that sub-DPB parameters will be signalled for more than one sub-layer), video encoder 20 may be further configured to signal an additional syntax element (sub_layer_dpb_info_present_flag[i][j]) for each sub-layer in each sub-DPB indicating whether or not the sub-DPB parameters will be signalled for a particular sub-layer.

In the example of Table 4, the if statement ("if(j>0 && sub_layer_flag_info_present_flag[i] && sub_layer_dpb_info_present_flag[i][j−1]" )) requires video encoder 20 to signal the sub_layer_dpb_info_present_flag[i][j] for a particular sub-layer only if the value of sub_layer_flag_info_present_flag[i] is 1 and the value sub_layer_dpb_info_present_flag of the previous sub-layer (sub_layer_dpb_info_present_flag[i][j−1]) has a value of 1. That is, video encoder 20 does not signal the sub_layer_dpb_info_present_flag, or any sub-DPB parameters, if sub-DPB parameters were not signalled for a previous sub-layer.

In one example of the disclosure, the requirement of checking the value of the sub_layer_dpb_info_present_flag for a previous sub-layer is removed. Instead, the sub_layer_dpb_info_present_flag may be signalled for every sub-layer, regardless of any previous values of the sub_layer_dpb_info_present_flag.

Semantics associated with the syntax elements of Table 4 above are described in as follows. As used herein, NumSubDpbs[i] may denote a number of sub-DPBs required for an i-th output layer set.

The value of syntax element sub_layer_flag_info_present_flag[i] equal to 1 indicates that sub_layer_dpb_info_present_flag[i][j] is present for all sub-layers in the $i^{th}$ output layer set. The maximum number of sub-layers is indicated by the value of syntax element vps_max_sub_layers_minus1. In other words, when video encoder 20 generates a sub_layer_flag_info_present_flag[i] with a value of 1, video decoder 30 determines that an additional flag (i.e., sub_layer_dpb_info_present_flag[i][j]) will be signaled for all sub-layers of the $i^{th}$ output layer set.

Conversely, if video encoder 20 generates sub_layer_flag_info_present_flag[i] syntax element with a value equal to 0, video decoder 30 may determine that the sub_layer_flag_info_present_flag[i] syntax element specifies that, for each value of j greater than 0, sub_layer_dpb_info_present_flag[i][j] is not present, and video decoder 30 may infer the value to be equal to 0. As such, video encoder 20 would use the initially signaled values of the sub-DPB parameters (i.e., max_vps_dec_pic_buffering_minus1[i][k][j], max_vps_num_reorder_pics[i][j], and max_vps_latency_increase_plus1[i][j]) for every sub-layer.

As described above, if video encoder 20 generates the sub_layer_flag_info_present_flag[i] with a value of 1, video encoder 20 also generates a sub_layer_dpb_info_present_flag[i][j] for each sub-layer of an output layer set. If the value of the sub_layer_dpb_info_present_flag[i][j] syntax element is equal to 1, then video decoder 30 may further receive the sub-DPB size (max_vps_dec_pic_buffering_minus1[i][k][j]), for sub-layer j for every sub-DPB k in the range of 0 to the maximum number of sub-DPBs (NumSubDpbs[i]−1), inclusive. Video decoder 30 is configured to also receive syntax elements that indicate the maximum latency (max_vps_latency_increase_plus1[i][j]), and maximum number of reorder pictures (max_vps_num_reorder_pics[i][j]) for sub-layer j.

On the other hand, if video decoder 30 determines that the value of the sub_layer_dpb_info_present_flag[i][j] syntax element is equal to 0, then video decoder 30 may determine that the sub_layer_dpb_info_present_flag[i][j] syntax element specifies that the values of max_vps_dec_pic_buffering_minus1[i][k][j] are equal to max_vps_dec_pic_buffering_minus1[i][k][j−1] (i.e., equal to value of the DPB size syntax element for the previous sub-layer in the output layer set) for k in the range of 0 to (NumSubDpbs[i]−1), inclusive. Also, video decoder 30 may further determine that the values of the maximum number of reorder pictures sytnax element (max_vps_num_reorder_pics[i][j]) and maximum latency syntax element (max_vps_latency_increase_plus1[i][j]) for sub-layer j are set equal to be equal to the value of those syntax elements for the previous sub-layer in the output layer set (i.e., max_vps_num_reorder_pics[i][j−1] and max_vps_latency_increase_plus1[i][j−1], respectively). Additionally, video decoder 30 may infer the value of the sub_layer_dpb_info_present_flag[i][0] syntax element for any possible value of i to be equal to 1. That is, the video decoder 30 may be configured to infer a value of 1 for the sub_layer_dpb_info_present_flag for the $0^{th}$ (i.e., first) sub-layer of an output layer set. Additionally, video decoder 30 may infer the value of sub_layer_dpb_info_present_flag[i][k] syntax element is equal to 0 for k in the range of j+1 to vps_max_sub_layers_minus1, inclusive.

The syntax element max_vps_dec_pic_buffering_minus1[i][k][j] plus 1 specifies the maximum required size of the k-th sub-DPB for the CVS in the i-th output layer set in units of picture storage buffers when HighestTid is equal to j. When j is greater than 0, video decoder 30 may determine that max_vps_dec_pic_buffering_minus1[i][k][j] is greater than or equal to the value of max_vps_dec_pic_buffering_minus1[i][k][j−1]. When max_vps_dec_pic_buffering_minus1[i][k][j] is not present for j in the range of 1 to (vps_max_sub_layers_minus1−1), inclusive, video decoder 30 may infer the value of max_vps_dec_pic_buffering_minus1[i][k][j] to be equal to the value of max_vps_dec_pic_buffering_minus1[i][k][j−1].

The syntax element max_vps_num_reorder_pics[i][j] indicates the maximum number of reorder pictures. That is, the maximum allowed number of access units containing a picture with PicOutputFlag equal to 1 that can precede any access unit auA that contains a picture with PicOutputFlag equal to 1 in the i-th output layer set in the CVS in decoding order and follow the access unit auA that contains a picture with PicOutputFlag equal to 1 in output order, when HighestTid is equal to j. When max_vps_num_reorder_pics[i][j] is not present for j in the range of 1 to (vps_max_sub_layers_minus1−1), inclusive, due to sub_layer_dpb_info_present_flag[i][j] being equal to 0, video decoder 30 may infer the value of the max_vps_num_reorder_pics[i][j] syntax element to be equal to the value of max_vps_num_reorder_pics[i][j−1].

The value of syntax element max_vps_latency_increase_plus1[i][j] indicates the maximum latency. The syntax element max_vps_latency_increase_plus1[i][j] not equal to 0 is used to compute the value of the VpsMaxLatencyPictures[i][k][j] syntax element, the value of which specifies the maximum number of access units that contain a picture with PicOutputFlag equal to 1 in the i-th output layer set that can precede any access unit auA that contains a picture with PicOutputFlag equal to 1 in the CVS in output order and follow the access unit auA that contains a picture with PicOutputFlag equal to 1 in decoding order when HighestTid is equal to j. In instances where max_vps_latency_increase_plus1[i][j] is not present for j in the range of 1 to (vps_max_sub_layers_minus1−1), inclusive, due to sub_layer_dpb_info_present_flag[i][j] being equal to 0, video decoder 30 may infer the value of max_vps_latency_increase_plus1[i][j] to be equal to max_vps_latency_increase_plus1[i][j−1].

When max_vps_latency_increase_plus1[i][j] is not equal to 0, video encoder 20 may specify the value of VpsMaxLatencyPictures[i][k][j] as follows:

$$\text{VpsMaxLatencyPictures}[i][j]=\text{max\_vps\_num\_reorder\_pics}[i][j]+\text{max\_vps\_latency\_increase\_plus1}[i][j]-1$$

That is, the maximum number of latency picture is equal to the maximum number of reorder pictures plus the value of the maximum latency sytnax element.

When max_vps_latency_increase_plus1[i][j] is equal to 0, no corresponding limit is expressed. The value of max_vps_latency_increase_plus1[i][j] shall be in the range of 0 to [(2^32)−2], inclusive.

The following shows changes to the output and removal of pictures process relative to HEVC subclasue F.13.5.2.2 in order to implement example techniques of this disclosure. Again, additions are shown with bolding and underlining, and deletions are shown with a ~~strikethrough~~.

The output and removal of pictures from the DPB before the decoding of the current picture by video decoder 30 (but after parsing the slice header of the first slice of the current picture) happens instantaneously when the first decoding unit of the current picture is removed from the CPB and proceeds as follows: The decoding process for RPS as specified in subclause F.8.3.2 is invoked.

If the current picture is an IRAP picture with NoRaslOutputFlag equal to 1 and with nuh_layer_id equal to 0 that is not picture 0, video decoder 30 may apply the following ordered steps are applied:
1. Video decoder 30 may derive the variable NoOutputOfPriorPicsFlag for the decoder under test as follows:
   If the current picture is a CRA picture, video decoder 30 may set the NoOutputOfPriorPicsFlag equal to 1 (regardless of the value of no_output_of_prior_pics_flag).
   Otherwise, if the value of pic_width_in_luma_samples, pic_height_in_luma_samples, or sps_max_dec_pic_buffering_minus1[HighestTid] derived from the active SPS is different from the value of
   pic_width_in_luma_samples, pic_height_in_luma_samples, or
   sps_max_dec_pic_buffering_minus1[HighestTid], respectively, derived from the SPS active for the preceding picture in the decoding order with the same nuh_layer_id value as the current picture, video decoder 30 may set NoOutputOfPriorPicsFlag to 1 under test, regardless of the value of no_output_of_prior_pics_flag. However, in preferred examples, video decoder 30 may not set NoOutputOfPriorPicsFlag to 1 under test under the conditions specified in this bullet. NOTE—Although setting NoOutputOfPriorPicsFlag equal to no_output_of_prior_pics_flag may be preferred under these conditions, video decoder 30, under test, is allowed to set NoOutputOfPriorPicsFlag to 1 under these conditions.

Otherwise, video decoder 30 may set NoOutputOfPriorPicsFlag equal to no_output_of_prior_pics_flag.

2. Video decoder 30 may apply the value of NoOutputOfPriorPicsFlag derived under test is applied for the HRD as follows:

If NoOutputOfPriorPicsFlag is equal to 1, video decoder 30 may empty all picture storage buffers in all the sub-DPBs in the DPB without output of the pictures contained in the emptied picture storage buffers, and video decoder 30 may set the sub-DPB fullness equal to 0 for all of the sub-DPBs.

Otherwise (i.e., NoOutputOfPriorPicsFlag is equal to 0), video decoder 30 may empty all picture storage buffers containing a picture that is marked as "not needed for output" and "unused for reference" without output, and video decoder 30 may empty all non-empty picture storage buffers in the DPB by repeatedly invoking the "bumping" process specified in subclause F.13.5.2.4, and video decoder 30 may set the DPB fullness equal to 0.

Otherwise (e.g., if the current picture is not an IRAP picture with NoRaslOutputFlag equal to 1 or with nuh_layer_id not equal to 0), video decoder 30 may empty all picture storage buffers containing a picture that is marked as "not needed for output" and "unused for reference" without output. For each picture storage buffer that is emptied, video decoder 30 may decrement the sub-DPB fullness of the sub-DPB associated with that picture storage buffer by one. The variable currLayerId is set equal to nuh_layer_id of the current decoded picture, the variable currSubDpbId is set equal to the index of the sub-DPB associated with the current decoded picture, and when one or more of the following conditions are true, the "bumping" process specified in subclause F.13.5.2.4 is invoked repeatedly while further decrementing the DPB fullness by one for each additional picture storage buffer that is emptied, until none of the following conditions are true:

The number of access units that contain at least one picture ~~pictures with nuh_layer_id equal to currLayerId in the sub-DPB that is associated with the current picture,~~ that ~~are~~ is marked as "needed for output" is greater than sps_max_num_reorder_pics[HighestTid] from the active SPS (when a coded video sequence conforming to one or more of the profiles specified in Annex A is decoded by applying the decoding process specified in clauses 2-10) or max_vps_num_reorder_pics[TargetOutputLayerId]

~~[LayerIdxIn Vps[currLaye rId]]~~ [HighestTid] from the active layer VPS for the value of currLayerId (when a coded video sequence conforming to one or more of the profiles specified in Annex G or H is decoded by applying the decoding process specified in clauses 2-10, Annex F, and Annex G or H).

sps_max_latency_increase_plus1[HighestTid] of the active SPS (when a coded video sequence conforming to one or more of the profiles specified in Annex A is decoded by applying the decoding process specified in clauses 2-10) or VpsMaxLatencyPictures[TargetOutputLayerId]

~~[LayerIdxInVps[currLayerId]]~~ [HighestTid] of the active VPS (when a coded video sequence conforming to one or more of the profiles specified in Annex G or H is decoded by applying the decoding process specified in clauses 2-10, Annex F, and Annex G or H) is not equal to 0 and there is at least one access unit that contains a picture that is marked as "needed for output" ~~picture with nuh_layer_id equal to currLayerId~~ in the DPB ~~that is marked as~~ ~~"needed for~~ ~~output"~~ for which the associated variable PicLatencyCount[currLayerId] is greater than or equal to SpsMaxLatencyPictures[HighestTid] derived from the active SPS (when a coded video sequence conforming to one or more of the profiles specified in Annex A is decoded by applying the decoding process specified in clauses 2-10) or VpsMaxLatencyPictures[TargetOutputLayerId]

~~[LayerIdxIn Vps[curr LayerId]]~~ [HighestTid] from the active VPS for the value of currLayerId (when a coded video sequence conforming to one or more of the profiles specified in Annex G or H is decoded by applying the decoding process specified in clauses 2-10, Annex F, and Annex G or H).

The number of pictures with nuh_layer_id equal to currLayerId in the associated sub-DPB is greater than or equal to sps_max_dec_pic_buffering_minus1[HighestTid]+1 from the active SPS (when a coded video sequence conforming to one or more of the profiles specified in Annex A is decoded by applying the decoding process specified in clauses 2-10) or max_vps_dec_pic_buffering_minus1[TargetOutputLayerId][currSubDpbId][HighestTid]+1 (when a coded video sequence conforming to one or more of the profiles specified in Annex G or H is decoded by applying the decoding process specified in clauses 2-10, Annex F, and Annex G or H).

As shown above in the marked additions and deletions, the picture output and removal process (also called "bumping") is updated to reflect the sub-DPB parameter signaling techniques of this disclosure. One change is that the conditions for continuing the bumping process are based on access units rather than pictures. This is because, according to the techniques of this disclosure, the sub-DPB parameters apply to an output layer. Also in this regard, the necessity of checking the values of sub-DPB parameters for particular layer IDs (e.g., LayerIdxlnVps and currLayerId) is removed, as every layer of a particular output layer set shares that same sub-DPB parameters.

The following shows changes to the picture decoding, marking, additional bumping, and storage processes relative to HEVC subclasue C.1.1.1.1 in order to implement example techniques of this disclosure. Again, additions are shown with bolding and underlining,, and deletions are shown with a ~~strikethrough.~~

The processes specified in this subclause happen instantaneously when video encoder 20 and/or video decoder 30 remove the last decoding unit of access unit n containing the current picture from the CPB. Video encoder 20 and/or video decoder 30 may set the variable currLayerId equal to nuh_layer_id of the current decoded picture, and may set currSubDpbId equal to the index of the sub-DPB associated with the layer that the current picture is associated with. Changes introduced by the techniques of this disclosure to the specified picture decoding, marking, additional bumping and storage processes are denoted below using underlined and stricken-through text.

For access unit containing a picture in the associated sub-DPB that is marked as " needed for output", video encoder 20 and/or video decoder 30 may set the associated variable PicLatencyCount equal to PicLatency Count + 1.

<u>Video decoder 30 may consider the current picture as decoded after the last decoding unit of the picture is decoded. The current decoded picture is stored in an empty picture storage buffer in the DPB, and the following apply:</u>
  <u>If the current decoded picture has PicOutputFlag equal to 1, video decoder 30 may mark the current decoded picture as "needed for output" and the variable PicLatencyCount associated with the current access unit is set equal to 0.</u>
  <u>Otherwise (e.g., the current decoded picture has PicOutputFlag equal to 0), video decoder 30 may mark the current decoded picture as "not needed for output".</u>

Additionally, video decoder 30 may mark the current decoded picture as "used for short-term reference."

When one or more of the following conditions are true, video decoder 30 may repeatedly/iteratively invoke the "bumping" process specified in subclause F.13.5.2.4, until none of the following conditions are true:
  The <u>number of access units that contain at least one picture</u> that <u>is</u> marked as "needed for output" is greater than sps_max_num_reorder_pics[HighestTid] from the active SPS <u>when a coded video sequence conforming to one or more of the profiles specified in Annex A is decoded by applying the decoding process specified in clauses 2-10)</u> or max_vps_num_reorder_pics[TargetOutputLayerId][HighestTid] from the active VPS for the value of currLayerId <u>(when a coded video sequence conforming to one or more of the profiles specified in Annex G or H is decoded by applying the decoding process specified in clauses 2-10, Annex F, and Annex G or H).</u>
  sps_max_latency_increase_plus1[HighestTid] is not equal to 0 <u>when a coded video sequence conforming to one or more of the profiles specified in Annex A is decoded by applying the decoding process specified in clauses 2-10) or</u> VpsMaxLatencyPictures[TargetOutputLayerId][HighestTid] the active VPS <u>(when a coded video sequence conforming to one or more of the profiles specified in Annex G or H) is decoded by applying the decoding process specified in clauses 2-10, Annex F, and Annex G or H)</u> is not equal to 0 and there is at least <u>one access unit containing a picture marked as "needed for output"</u> for which the associated variable PicLatencyCount that is greater than or equal to
  SpsMaxLatencyPictures[HighestTid] derived from the active SPS <u>(when a coded video sequence conforming to one or more of the profiles specified in Annex A is decoded by applying the decoding process specified in clauses 2-10)</u> or VpsMaxLatencyPictures[TargetOutputLayerId][HighestTid] from the active VPS for the value of currLayerId <u>(when a coded video sequence conforming to one or more of the profiles specified in Annex G or H is decoded by applying the decoding process specified in clauses 2-10, Annex F, and Annex G or H).</u>

As shown above in the marked additions and deletions, the picture output and removal process (also called "bumping") is updated to reflect the sub-DPB parameter signaling techniques of this disclosure. One change is that the conditions for continuing the bumping process are based on access units rather than pictures. This is because, according to the techniques of this disclosure, the sub-DPB parameters apply to an entire output layer set and not just a sub-set of the layers.

The following is a description of a second example implementation relative to the first example implementation described above. In contrast to first example implementation, according to the second example implementation, video encoder 20 may signal a layer ID that specifies the layer with which the values of max_vps_num_reorder_pics[i][j] and max_vps_latency_increase_plus1[i][j] are associated. The changes to the syntax and semantics introduced by the second example implementation, are distinguished below using bold and underline and ~~strikethrough~~ formatting, as was shown above. The syntax and semantics of the other syntax elements (i.e., denoted by text that is neither underlined nor stricken-through) remain the same, according to the second example implementation

TABLE 5

DPB size table syntax

```
dpb_size_table( ) {
    for( i = 1; i < NumOutputLayerSets; i++ ) {
        sub_layer_flag_info_present_flag[ i ]                                  u(1)
        for( j = 0; j <= vps_max_sub_layers_minus1; j++ ) {
            if( j > 0 && sub_layer_flag_info_present_flag[ i ] &&
                sub_layer_dpb_info_present_flag[ i ][ j − 1 ] )
                sub_layer_dpb_info_present_flag[ i ][ j ]                      u(1)
            if( sub_layer_dpb_info_present_flag[ i ][ j ] ) {
                for( k = 0; k < NumSubDpbs[ i ]; k++ )
                    max_vps_dec_pic_buffering_minus1[ i ][ k ][ j ]            ue(v)
                reorder_info_layer_id[ i ][ j ]
                max_vps_num_reorder_pics[ i ][ j ]                             ue(v)
                max_vps_latency_increase_plus1[ i ][ j ]                       ue(v)
            }
        }
    }
}
```

Table 5 above describes syntax changes introduced by the second example implementation relative to the first example implementation. Changes to semantics, as introduced by the second example implementation are described below.

Video decoder 30 may determine that the reorder_info_layer_id [i][j] syntax element specifies the nuh_layer_id value of the layer that belongs to the i-th output layer set to which the values of max_vps_num_reorder_pics[i][j] and max_vps_latency_increase_plus1[i][j] apply. In instances where the reorder_info_layer_id[i][j] syntax element is not present, video decoder 30 may infer the value of reorder_info_layer_id[i][j] to be equal to 0. Alternatively, in some examples, when reorder_info_layer_id[i][j] is not present, video decoder 30 may infer the value of the reorder_info_layer_id[i][j] to be equal to the nuh_layer_id of the highest layer in the i-th output layer set. Alternatively, in some examples, video encoder 20 may signal a flag which specifies to video decoder 30 whether the reorder_info_layer_id[i][j] syntax element is signalled.

Video decoder 30 may determine that the max_vps_num_reorder_pics [i][j] syntax element indicates the maximum allowed number of pictures with nuh_layer_id equal to reorder_info_layer_id [i][j] that can precede any picture with nuh_layer_id equal to reorder_info_layer_id[ [i][j] in the i-th output layer set in the CVS in decoding order, and follow that picture with nuh_layer_id equal to reorder_info_layer_id [i][j] in output order, and when HighestTid is equal to j. When max_vps_num_reorder_pics[i][j] is not present for j in the range of 1 to (vps_max_sub_layers_minus1−1), inclusive, due to sub_layer_dpb_info_present_flag[i][j] being equal to 0, video decoder 30 may infer the value of the max_vps_num_reorder_pics[i][j] syntax element to be equal to max_vps_num_reorder_pics[i][j−1].

In instances where the value of max_vps_latency_increase_plus1 [i][j] is not equal to 0, video decoder 30 may use the value of the max_vps_latency_increase_plus1[i][j] syntax element to compute the value of VpsMaxLatencyPictures[i][k][j]. The value of the VpsMaxLatencyPictures[i][k][j] syntax element, in turn, may specify the maximum number of pictures with nuh_layer_id equal to reorder_info_layer_id [i][j] in the i-th output layer set that can precede any picture with nuh_layer_id equal to reorder_info_layer_id [i][j] in the CVS in output order and follow that picture with nuh_layer_id equal to reorder_info_layer_id [i][j] in decoding order when HighestTid is equal to j. In examples where max_vps_latency_increase_plus1[i][j] is not present for j in the range of 1 to (vps_max_sub_layers_minus1−1), inclusive, due to the value of sub_layer_dpb_info_present_flag[i][j] being equal to 0, video decoder 30 may infer the value of max_vps_latency_increase_plus1[i][j] to be equal to max_vps_latency_increase_plus1[i][j−1].

In instances where max_vps_latency_increase_plus1[i][j] is not equal to 0, the value of VpsMaxLatencyPictures[i][k][j] is specified by a formula as follows:

$$VpsMaxLatencyPictures[i][j]=max\_vps\_num\_reorder\_pics[i][j]+max\_vps\_latency\_increase\_plus1[i][j]-1$$

Conversely, in examples where, max_vps_latency_increase_plus1[i][j] is equal to 0, no corresponding limit is expressed. In these examples, video encoder 20 and/or video decoder 30 may determine that the value of max_vps_latency_increase_plus1[i][j] is in the range of 0 to ($2^{32}-2$), inclusive.

The following describes a third example implementation relative to the first example implementation. However, in contrast to the first example implementation, according to the third example implementation, video encoder 20 may signal a flag to specify whether the maximum number of reorder pictures and the maximum latency are signaled for each layer in the output layer set. For instance, according to the third example implementation, video encoder 20 may set the flag to a first value to indicate that the maximum number of reorder pictures and the maximum latency are signaled for each layer in the output layer set, and to a second value to indicate that the maximum number of reorder pictures and the maximum latency are not signaled for each layer in the output layer set. Changes introduced by the third example implementation, in comparison to syntax provided by the first example implementation, are distinguished by underlining and bolding in Table 6 below.

TABLE 6

DPB Size table syntax

| | |
|---|---|
| dpb_size_table( ) { | |
|   for( i = 1; i < NumOutputLayerSets; i++ ) { | |
|     sub_layer_flag_info_present_flag[ i ] | u(1) |
|     for( j = 0; j <= vps_max_sub_layers_minus1; j++) { | |
|       if( j > 0 && sub_layer_flag_info_present_flag[ i ] && sub_layer_dpb_info_present_flag[ i ][ j − 1 ] ) | |
|         sub_layer_dpb_info_present_flag[ i ][ j ] | u(1) |
|       if( sub_layer_dpb_info_present_flag[ i ][ j ] ) { | |
|         for( k = 0; k < NumSubDpbs[ i ]; k++ ) | |
|           max_vps_dec_pic_buffering_minus1[ i ][ k ][ j ] | ue(v) |
|         reorder_info_only_highest_layer_flag[ i ][ j ] | u(1) |
|         for( k = reorder_info_only_highest_layer_flag[ i ][ j ] ? NumLayersInIdList[ output_layer_set_idx_minus1[ i ] + 1 ] − 1 : 0; k <= NumLayersInIdList[ output_layer_set_idx_minus1[ i ] + 1 ] − 1; k++ ) { | |
|           max_vps_num_reorder_pics[ i ][ k ][ j ] | ue(v) |
|           max_vps_latency_increase_plus1[ i ][ k ][ j ] | ue(v) |
|         } | |
|       } | |
|     } | |
|   } | |
| } | |

New semantics introduced by the third example implementation with respect to the DPB size table of Table 6, as compared to the first example implementation, are described below. Any semantics that are not described below with respect to the third example implementation remain the same as in the first example implementation.

In examples where video encoder 20 sets the sub_layer_flag_info_present_flag [i] equal to 1, the sub_layer_flag_info_present_flag[i] specifies that sub_layer_dpb_info_present_flag[i][j] is present for vps_max_sub_layers_minus1 sub-layers. Conversely, in examples where video encoder 20 sets sub_layer_flag_info_present_flag[i] equal to 0, the sub_layer_flag_info_present_flag[i] specifies that, for each value of j greater than 0, sub_layer_dpb_info_present_flag[i][j] is not present. In some examples where video encoder 20 sets the sub_layer_flag_info_present_flag [i] to 0, video decoder 30 may infer the value of the sub_layer_dpb_info_present_flag[i][j] to be equal to 0.

In examples where video encoder sets the sub_layer_dpb_info_present_flag [i][j] equal to 1, the sub_layer_dpb_info_present_flag[i][j] specifies to video decoder 30 that max_vps_dec_pic_buffering_minus1[i][k][j], for k in the range of 0 to (NumSubDpbs[i]−1), inclusive, and reorder_info_only_highest_layer_flag[i][j] are present for the j-th sub-layer. On the other hand, in examples where video encoder 20 sets the sub_layer_dpb_info_present_flag [i][j] equal to 0, the sub_layer_dpb_info_present_flag[i][j] specifies to video decoder 30 that the values of max_vps_dec_pic_buffering_minus1[i][k][j] are equal to max_vps_dec_pic_buffering_minus1[i][k][j−1] for k in the range of 0 to (NumSubDpbs[i]−1), inclusive, and that the values max_vps_num_reorder_pics[i][k][j] and max_vps_latency_increase_plus1[i][k][j] are set equal to max_vps_num_reorder_pics[i][k][j−1] and max_vps_latency_increase_plus1[i][k][j−1], respectively, for k in the range of 0 to (NumLayersInIdList[output_layer_set_idx_minus1[i]+1]−1), inclusive. Video decoder 30 may infer the value of sub_layer_dpb_info_present_flag[i][0] for any possible value of i to be equal to 1.

The value of max_vps_dec_pic_buffering_minus1 [i][k][j] plus 1 specifies the maximum required size of the k-th sub-DPB for the CVS in the i-th output layer set in units of picture storage buffers when HighestTid is equal to j. When j is greater than 0, max_vps_dec_pic_buffering_minus1[i][k][j] shall be greater than or equal to max_vps_dec_pic_buffering_minus1[i][k][j−1]. When max_vps_dec_pic_buffering_minus1[i][k][j] is not present for j in the range of 1 to (vps_max_sub_layers_minus1−1), inclusive, video decoder 30 may infer max_vps_dec_pic_buffering_minus1[i][k][j] to be equal to max_vps_dec_pic_buffering_minus1[i][k][j−1].

In examples where reorder_info_only_highest_layer_flag [i][j] is equal to 1, the reorder_info_only_highest_layer_flag[i][j] indicates to video decoder 30 that the syntax elements max_vps_num_reorder_pics[i][NumLayersInIdList[output_layer_set_idx_minus1[i]+1]−1][j] and max_vps_latency_increase_plus1[i][NumLayersInIdList[output_layer_set_idx_minus 1[i]+1]−1][j] are present and max_vps_num_reorder_pics[i][k][j] and max_vps_latency_increase_plus1[i][k][j], for k in the range of 0 to (NumLayersInIdList [output_layer_set_idx_minus1[i]+1]−2), inclusive, are inferred (e.g., by video decoder 30) to be equal to max_vps_num_reorder_pics[i][NumLayersInIdList[output_layer_set_idx_minus1[i]+1]−1][j] and max_vps_latency_increase_plus1[i][NumLayersInIdList[output_layer_set_idx_minus 1[i]+1]−1][j], respectively. On the other hand, in examples where reorder_info_only_highest_layer_flag[i][j] is equal to 0, the reorder_info_only_highest_layer_flag[i][j] indicates to video decoder 30 that the syntax elements max_vps_num_reorder_pics[i][k][j] and max_vps_latency_increase_plus1[i][k][j] are signalled (e.g., by video encoder 20) for k in the range of 0 to (NumLayersInIdList[output_layer_set_idx_minus1[i]+1]−1), inclusive.

The max_vps_num_reorder_pics[ [i][k][j] syntax element indicates (e.g., to video decoder 30) the maximum allowed number of pictures with nuh_layer_id equal to layer_id_in_nuh[k] that can precede any picture with nuh_layer_id equal to layer_id_in_nuh[k] in the i-th output layer set in the CVS in decoding order and follow that picture with nuh_layer_id equal to layer_id_in_nuh[k] in output order, and when HighestTid is equal to j. When max_vps_num_reorder_pics[i][k][j] is not present for j in the range of 1 to (vps_max_sub_layers_minus1−1), inclusive, due to sub_layer_dpb_info_present_flag[i][j] being equal to 0, it is inferred (e.g., by video decoder 30) to be equal to max_vps_num_reorder_pics[i][k][j−1]. Conversely, in examples where max_vps_num_reorder_pics[i][k][j] is not present for k in the range of 0 to (NumLayersInIdList[output_layer_set_idx_minus1[i]+1]−2), inclusive, due to sub_layer_dpb_info_present_flag[i][j] being equal to 1 and reorder_info_only_highest_layer_flag[i][j] equal to 0, video decoder 30 may infer max_vps_num_reorder_pics[i][k][j] to be equal to max_vps_num_reorder_pics[i][NumLayersInIdList[output_layer_set_idx_minus1[i]+1]−1][j−1].

In examples where max_vps_latency_increase_plus1 [i][k][j] is not equal to 0, video decoder 30 may use the max_vps_latency_increase_plus1[i][k][j] to compute the value of VpsMaxLatencyPictures[i][k][j], which specifies the maximum number of pictures with nuh_layer_id equal to layer_id_in_nuh[k] in the i-th output layer set that can precede any picture with nuh_layer_id equal to layer_id_in_nuh[k] in the CVS in output order and follow that picture with nuh_layer_id equal to layer_id_in_nuh[k] in decoding order when HighestTid is equal to j. In examples where max_vps_latency_increase_plus1[i][k][j] is not present for j in the range of 1 to (vps_max_sub_layers_minus1−1), inclusive, due to sub_layer_dpb_info_present_flag[i][j] being equal to 0, video decoder 30 may infer the max_vps_latency_increase_plus1[i][k][j] to be equal to max_vps_latency_increase_plus1[i][k][j−1]. In examples where max_vps_latency_increase_plus1[i][k][j] is not present for k in the range of 0 to (NumLayersInIdList[output_layer_set_idx_minus1[i]+1]−2), inclusive, due to sub_layer_dpb_info_present_flag[i][j] being equal to 1 and reorder_info_only_highest_layer_flag[i][j] equal to 0, video decoder 30 may infer the max_vps_latency_increase_plus1[i][k][j] to be equal to max_vps_latency_increase_plus1[i][NumLayersInIdList[output_layer_set_idx_minus 1[i]+1]−1][j].

In instances where max_vps_latency_increase_plus1[i][k][j] is not equal to 0, the value of VpsMaxLatencyPictures[i][k][j] is specified by a formula as follows:

$$VpsMaxLatencyPictures[i][k][j] = max\_vps\_num\_reorder\_pics[i][k][j] + max\_vps\_latency\_increase\_plus1[i][k][j] - 1$$

In instances where max_vps_latency_increase_plus1[i][k][j] is equal to 0, no corresponding limit is expressed. The value of max_vps_latency_increase_plus1[i][k][j], in such examples, shall be in the range of 0 to ($2^{32}$−2), inclusive.

Figure 6:
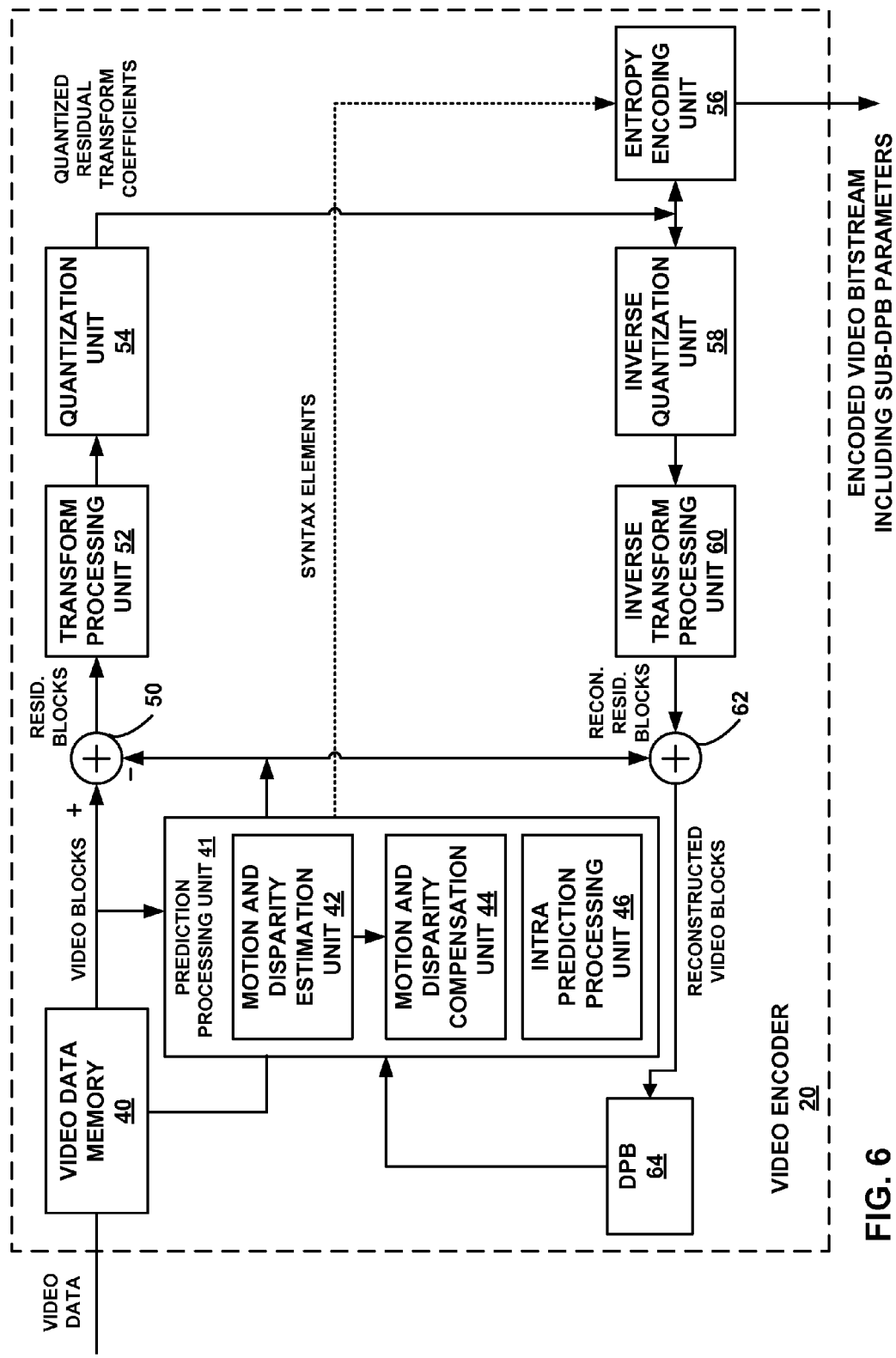
FIG. 6 is a block diagram illustrating an example video encoder that may implement the techniques described in this disclosure.

FIG. 6 is a block diagram illustrating an example video encoder 20 that may implement the techniques for sub-DPB parameter signaling described in this disclosure. Video encoder 20 may be configured to encode video data according to any video encoding techniques, including HEVC and H.264/AVC, as well as scalable, multiview and 3D extensions of such standards. The example of FIG. 6 will be explained with reference to HEVC. In this regard, the video encoding loop shown in FIG. 6 may be applied to each layer of a scalable video encoding process (i.e., base layers and enhancement layers), to each view of a multiview video coding process, or to both texture and depth views of a 3D video coding process.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes. In addition, video encoder 20 may perform inter-view prediction and/or inter-layer prediction between different views or layers, as described above.

In the example of FIG. 6, video encoder 20 includes video data memory 40, prediction processing unit 41, DPB 64, summer 50, transform processing unit 52, quantization unit 54, and entropy encoding unit 56. Prediction processing unit 41 includes motion and disparity estimation unit 42, motion and disparity compensation unit 44, and intra-prediction processing unit 46. For video block reconstruction, video encoder 20 also includes inverse quantization unit 58, inverse transform processing unit 60, and summer 62. A deblocking filter (not shown in FIG. 6) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. DPB 64 is one example of a decoding picture buffer (DPB that stores reference video data for use in encoding video data by video encoder 20 (e.g., in intra- or inter-coding modes, also referred to as intra- or inter-prediction coding modes). Video data memory 40 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and DPB 64 may be provided by the same memory device or separate memory devices. In various examples, video data memory 40 may be on-chip with other components of video encoder 20, or off-chip relative to those components.

As shown in FIG. 6, video encoder 20 receives video data and may be configured to partition the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes or interview coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion and disparity estimation unit 42 and motion and disparity compensation unit 44 within prediction processing unit 41 perform inter-predictive coding and/or interview coding of the current video block relative to one or more predictive blocks in one or more reference pictures, reference picture layers, and/or reference views to provide temporal and interview prediction.

Motion and disparity estimation unit 42 may be configured to determine the inter-prediction mode and/or interview prediction mode for a video slice according to a predetermined pattern for a video sequence. The predetermined pattern may designate video slices in the sequence as P slices or B slices. Motion and disparity estimation unit 42 and motion and disparity compensation unit 44 may be highly integrated, but are illustrated separately for conceptual purposes. Motion estimation, performed by motion and disparity estimation unit 42, is the process of generating motion vectors, which estimate motion for video blocks. A motion vector, for example, may indicate the displacement of a PU of a video block within a current video frame or picture relative to a predictive block within a reference picture. Disparity estimation, performed by motion and disparity estimation unit 42, is the process of generating disparity vectors, which may be used to predict a currently coded block from a block in a different view.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion and disparity estimation unit 42 calculates a motion vector (for motion compensated prediction) and/or a disparity vector (for disparity compensated prediction) for a PU of a video block in an inter-coded or interview predicted slice by comparing the position of the PU to the position of a predictive block of a reference picture. The reference picture may be selected from a first reference picture list (List 0) or a second reference picture list (List 1), each of which identify one or more reference pictures stored in DPB 64. For interview prediction, the reference picture is in a different view. Motion and disparity estimation unit 42 sends the calculated motion vector and/or disparity vector to entropy encoding unit 56 and motion and disparity compensation unit 44.

Motion compensation and/or disparity compensation, performed by motion and disparity compensation unit 44, may involve fetching or generating the predictive block based on the motion vector determined by motion estimation and/or disparity estimation, possibly performing interpolations to sub-pixel precision. Upon receiving the motion vector and/or disparity for the PU of the current video block, motion and disparity compensation unit 44 may locate the predictive block to which the motion vector and/or disparity vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion and disparity compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion and disparity estimation unit 42 and motion and disparity compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or a mode select unit, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. This part of video encoder 20 is sometimes called the reconstruction loop, and effectively decodes an encoded video block for use as a reference picture in inter-prediction. The reconstructed pictures and/or reconstructed layer pictures are stored in DPB 64.

Motion and disparity compensation unit 44 may calculate a reference block by adding the residual block to a predictive block of one of the reference pictures within one of the reference picture lists. Motion and disparity compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in DPB 64. The reference block may be used by motion and disparity estimation unit 42 and motion and disparity compensation unit 44 as a reference block to inter-predict a block in a subsequent video frame or picture.

As discussed above with reference to FIG. 5, DPB 64 may be partitioned into a plurality of sub-DPBs, where each sub-DPB is configured to store pictures for a different type of layer in a multi-layer video coding process. As was discussed above, and will be discussed in more detail below with reference to FIG. 8, video encoder 20 may be configured to perform the sub-DPB parameter signaling techniques of this disclosure.

Figure 7:
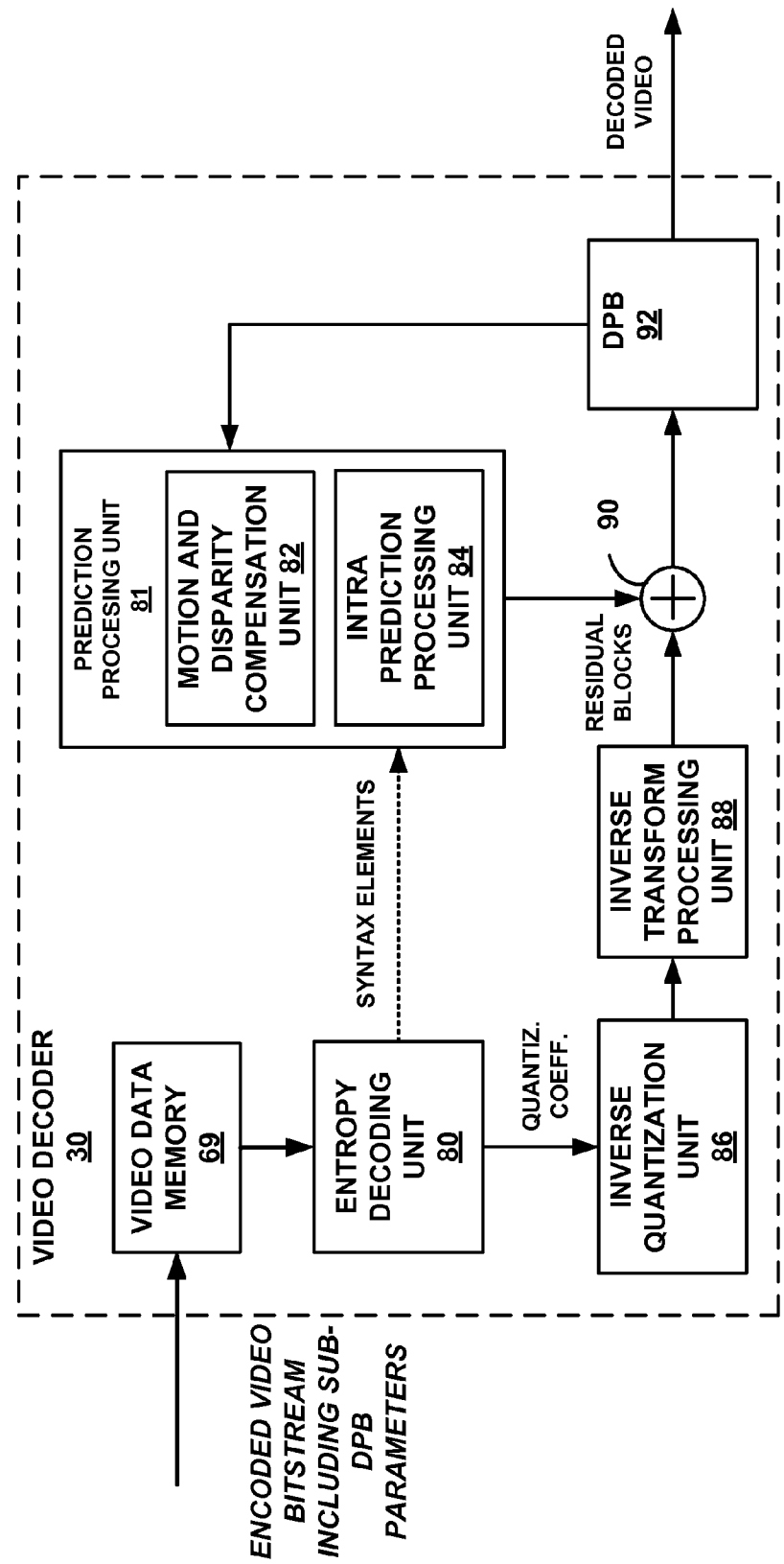
FIG. 7 is a block diagram illustrating an example video decoder that may implement the techniques described in this disclosure.

FIG. 7 is a block diagram illustrating an example video decoder 30 that may implement the sub-DPB parameter signaling techniques described in this disclosure. In the example of FIG. 7, video decoder 30 includes video data memory 69, entropy decoding unit 80, prediction processing unit 81, inverse quantization unit 86, inverse transformation processing unit 88, summer 90, and DPB 92. Prediction processing unit 81 includes motion and disparity compensation unit 82 and intra-prediction processing unit 84. Video decoder 30 may, in some examples, perform a decoding pass generally reciprocal to the encoding pass described with respect to video encoder 20 from FIG. 6.

Video data memory 69 may store video data, such as an encoded video bitstream, to be decoded by the components of video decoder 30. The video data stored in video data memory 69 may be obtained, for example, from storage device 34, from a local video source, such as a camera, via wired or wireless network communication of video data, or by accessing physical data storage media. Video data memory 69 may form a coded picture buffer (CPB) that stores encoded video data from an encoded video bitstream.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, disparity vectors, and other syntax elements. Entropy decoding unit 80 forwards the motion vectors, disparity vectors, and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, or P) slice or interview predicted slice, motion and disparity compensation unit 82 of prediction processing unit 81 produces predictive blocks for a video block of the current video slice based on the motion vectors, disparity vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 92.

Motion and disparity compensation unit 82 determines prediction information for a video block of the current video slice by parsing the motion vectors and other syntax elements, and uses the prediction information to produce the predictive blocks for the current video block being decoded. For example, motion and disparity compensation unit 82 uses some of the received syntax elements to determine a prediction mode (e.g., intra- or inter-prediction) used to code the video blocks of the video slice, an inter-prediction or interview prediction slice type (e.g., B slice or P slice), construction information for one or more of the reference picture lists for the slice, motion vectors and/or disparity vectors for each inter-encoded video block of the slice, inter-prediction status for each inter-coded video block of the slice, and other information to decode the video blocks in the current video slice.

Motion and disparity compensation unit 82 may also perform interpolation based on interpolation filters. Motion and disparity compensation unit 82 may use interpolation filters as used by video encoder 20 during encoding of the video blocks to calculate interpolated values for sub-integer pixels of reference blocks. In this case, motion and disparity compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion and disparity compensation unit 82 generates the predictive block for the current video block based on the motion vectors and/or disparity vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video in a given frame or picture are then stored in DPB 92, which stores reference pictures blocks (or layer pictures in a multi-layer video coding process) used for subsequent motion compensation. DPB 92 also stores decoded video for presentation on a display device, such as display device 32 of FIG. 1. As discussed above with reference to FIG. 5, DPB 92 may be partitioned into a plurality of sub-DPBs, where each sub-DPB is configured to store pictures for a different type of layer in a multi-layer video coding process. As was discussed above, and will be discussed in more detail below with reference to FIG. 9, video decoder 300 may be configured to perform the sub-DPB parameter signaling techniques of this disclosure.

Figure 8:
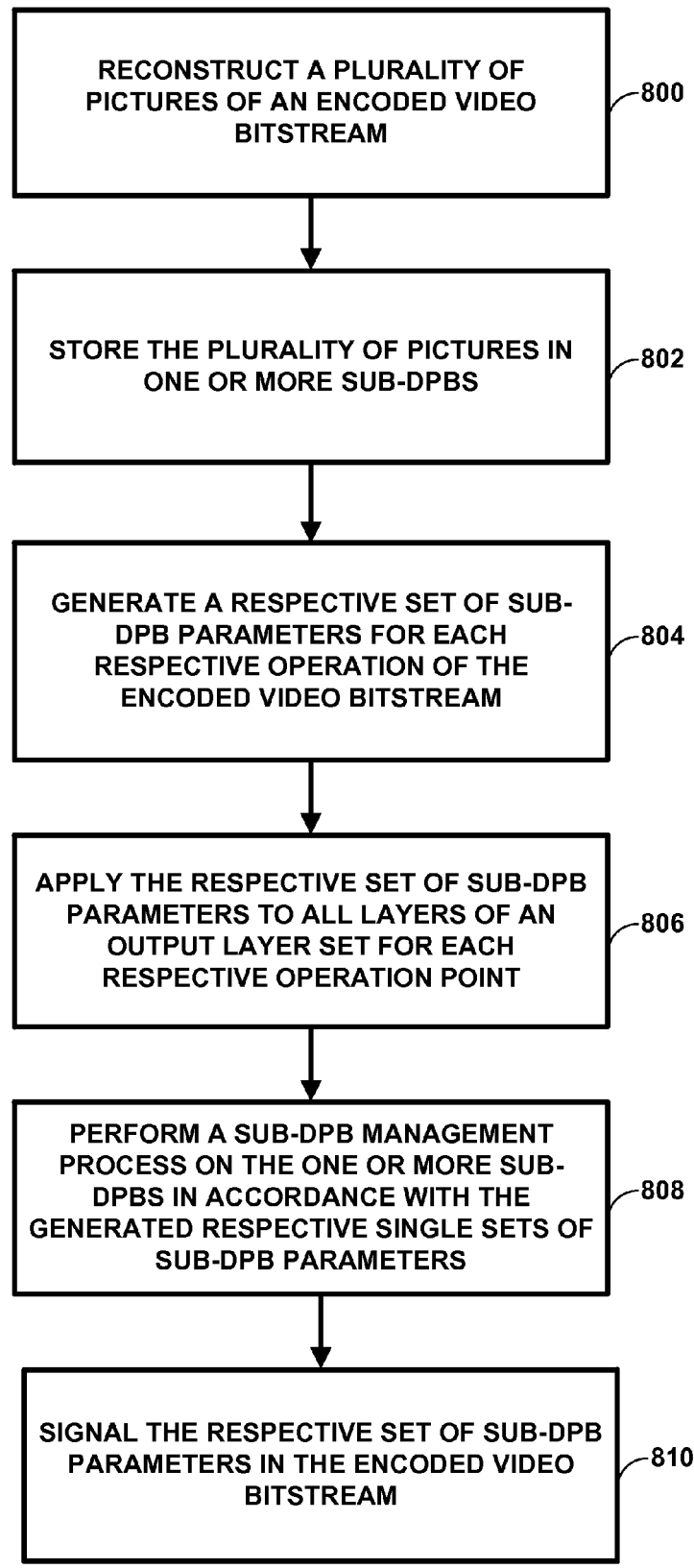
FIG. 8 is a flowchart showing an example encoding method according to an example of the techniques of this disclosure.

FIG. 8 is a flowchart showing an example encoding method according to the techniques of this disclosure. The techniques of FIG. 8 may be implemented by one or more hardware units of video encoder 20, including DPB 64.

In one example of the disclosure, video encoder 20 may be configured to reconstruct a plurality of pictures of an encoded video bitstream (800), and store the plurality of pictures in one or more sub-DPBs (802). That is, DPB 64 may be divided into one or more sub-DBPs. Video encoder 20 may be further configured to generate a respective set of sub-DPB parameters for each respective operation point of the encoded video bitstream (804), apply the respective set of sub-DPB parameters to all layers of an output layer set for each respective operation point (806), and perform a sub-DPB management process on the one or more sub-DPBs in accordance with the generated respective single sets of sub-DPB parameters (808). In one example of the disclosure, the sub-DPB parameters include at least one of a syntax element indicative of a maximum number of reorder pictures allowed for the one or more sub-DPBs and a syntax element indicative of a maximum latency allowed for the one or more sub-DPBs. Video encoder 20 may be further configured to signal the respective set of sub-DPB parameters in the encoded video bitstream (810).

In another example of the disclosure, video encoder 20 may be configured to generate the respective set of sub-DPB parameters in a video parameter set (VPS). In another example of the disclosure, video encoder 20 may be configured to generate a first respective sub-layer syntax element indicating whether or not sub-DPB parameters are signaled for each sub-layer of each respective output layer set. In another example of the disclosure, video encoder 20 may be configured to generate, in the case that the first sub-layer syntax element indicates that sub-DPB parameters may be signaled for each sub-layer of a particular output layer set, a second respective sub-layer syntax element indicating whether or not sub-DPB parameters are signaled for respective sub-layers of the particular output layer set. In another example of the disclosure, video encoder 20 may be configured to generate, in the case that the second respective sub-layer syntax element indicates that sub-DPB parameters are signaled for the particular sub-layer, an additional set of sub-DPB parameters for the particular sub-layer.

In another example of the disclosure, the sub-DPB management process includes at least one of marking pictures as unused for reference, marking pictures for output, and removing pictures from the sub-DPB, and wherein the performing the sub-DPB management process comprises performing the sub-DPB management process on an access unit level using the received respective sets of sub-DPB parameters. Video encoder 20 may be configured to perform the sub-DPB management process on the access unit level by outputting pictures based on the number of access units in a DPB that contain at least one picture marked as needed for output, marking pictures as unused for reference on a per-layer level (e.g., for each layer independently), and removing pictures from the sub-DPB on a per-layer level (e.g., for each layer independently).

Figure 9:
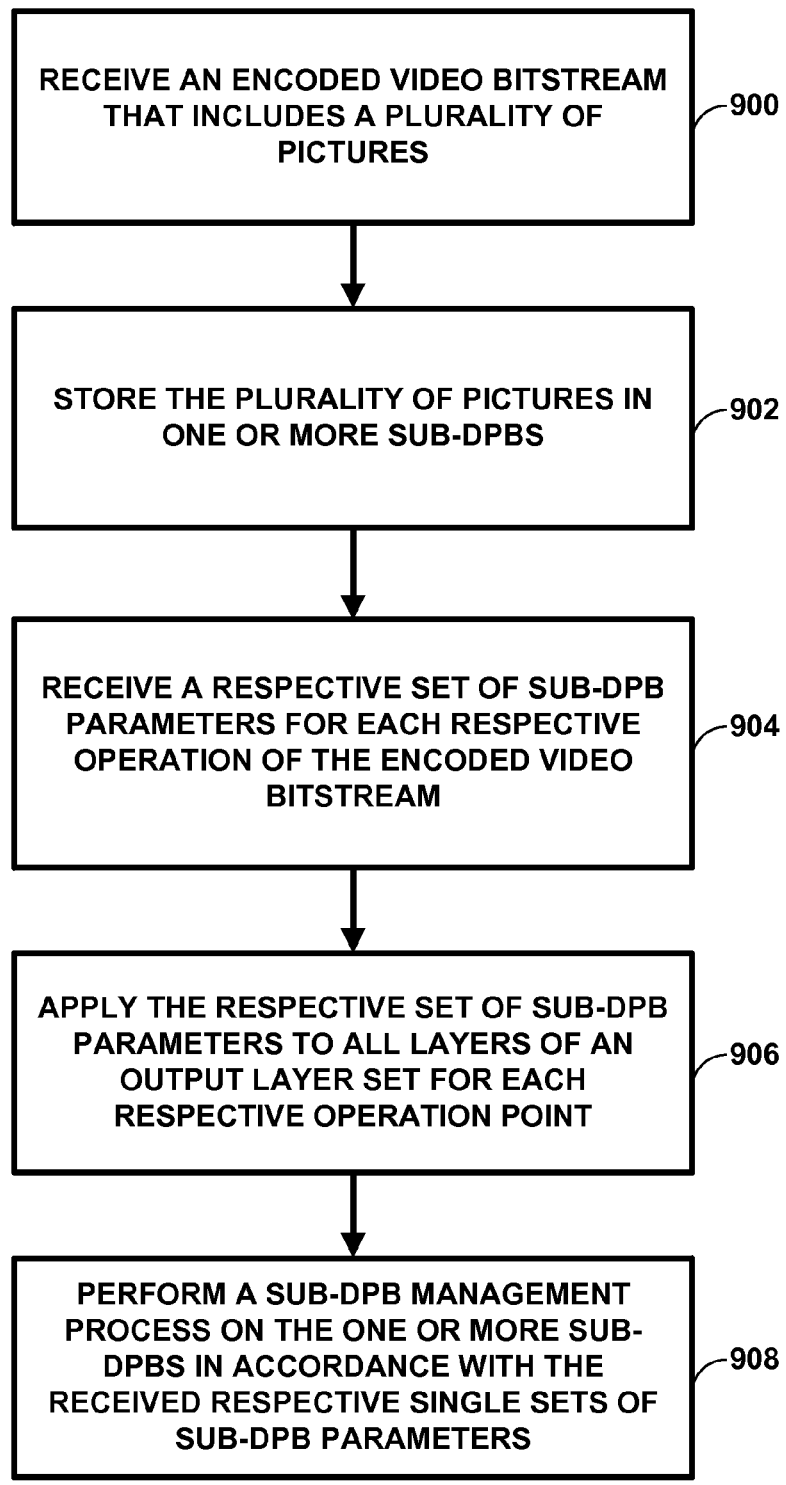
FIG. 9 is a flowchart showing an example decoding method according to an example of the techniques of this disclosure.

FIG. 9 is a flowchart showing an example decoding method according to the techniques of this disclosure. The techniques of FIG. 9 may be implemented by one or more hardware units of video67 decoder 30, including DPB 92.

In one example of the disclosure, video decoder 30 may be configured to receive an encoded video bitstream that includes a plurality of pictures (900), and store the plurality of pictures in one or more sub-DPBs (902). That is, DPB 92 may be divided into one or more sub-DBPs. Video decoder 30 may be further configured to receive a respective set of sub-DPB parameters for each respective operation point of the encoded video bitstream (904), apply the respective set of sub-DPB parameters to all layers of an output layer set for each respective operation point (906), and perform a sub-DPB management process on the one or more sub-DPBs in accordance with the received respective single sets of sub-DPB parameters (908). In one example of the disclosure, the sub-DPB parameters include at least one of a syntax element indicative of a maximum number of reorder pictures allowed for the one or more sub-DPBs and a syntax element indicative of a maximum latency allowed for the one or more sub-DPBs.

In another example of the disclosure, video decoder 30 may be configured to receive the respective set of sub-DPB parameters in a video parameter set (VPS). In another example of the disclosure, video decoder 30 may be configured to receive a first respective sub-layer syntax element indicating whether or not sub-DPB parameters are signaled for each sub-layer of each respective output layer set.

In another example of the disclosure, video decoder 30 may be configured to apply, in the case that the first sub-layer syntax element indicates that sub-DPB parameters are not signaled for each sub-layer of a particular output layer set, the respective set of sub-DPB parameters to all sub-layers of the particular output layer set. In another example of the disclosure, video decoder 30 may be configured to receive, in the case that the first sub-layer syntax element indicates that sub-DPB parameters may be signaled for each sub-layer of a particular output layer set, a second respective sub-layer syntax element indicating whether or not sub-DPB parameters are signaled for respective sub-layers of the particular output layer set.

In another example of the disclosure, video decoder 30 may be configured to apply, in the case that the second respective sub-layer syntax element indicates that sub-DPB parameters are not signaled for a particular sub-layer, the received respective set of sub-DPB parameters for the particular sub-layer. Furthermore, in the case that the second respective sub-layer syntax element indicates that sub-DPB parameters are signaled for the particular sub-layer, video decoder 30 may be configured to receive an additional set of sub-DPB parameters for the particular sub-layer.

In another example of the disclosure, video decoder 30 may be configured to apply, in the case that the second respective sub-layer syntax element indicates that sub-DPB parameters are not signaled for a particular sub-layer with a sub-layer ID X, a last received respective set of sub-DPB parameters for sub-layers that have the sub-layer ID greater than X.

In another example of the disclosure, the sub-DPB management process includes at least one of marking pictures as unused for reference, marking pictures for output, and removing pictures from the sub-DPB, and wherein the performing the sub-DPB management process comprises performing the sub-DPB management process on an access unit level using the received respective sets of sub-DPB parameters. Video decoder 30 may be configured to performing the sub-DPB management process on the access unit level by outputting pictures based on the number of access units in a DPB that contain at least one picture marked as needed for output, marking pictures as unused for reference on a per-layer level (e.g., for each layer independently), and removing pictures from the sub-DPB on a per-layer level (e.g., for each layer independently).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

As used herein, the term 'signaling' may include storing or otherwise including data with an encoded bitstream. In other words, in various examples in accordance with this disclosure, the term 'signaling' may be associated with real-time communication of data, or alternatively, communication that is not performed in real-time.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
receiving, from an encoded video bitstream, a plurality of output layer sets, wherein each output layer set of the plurality of output layer sets includes a respective plurality of sub-layers, wherein each respective plurality of sub-layers includes a first sub-layer and one or more sub-layers other than the first sub-layer, wherein the first sub-layer of each respective plurality of sub-layers is a base sub-layer;
decoding each respective plurality of sub-layers of the plurality of output layer sets;
storing each respective decoded plurality of sub-layers in one or more sub-decoded picture buffers (DPBs);
receiving, from the encoded video bitstream, a first respective syntax element for each output layer set of the plurality of output layer sets, wherein each first respective syntax element is indicative of whether or not sub-DPB parameters are signaled for each sub-layer of each respective output layer set;
receiving, from the encoded video bitstream, a second respective syntax element for each sub-layer of the one or more sub-layers other than the first sub-layer of a first particular output layer set of the plurality of output layer sets but not for the first sub-layer of the first particular output layer set, wherein each second respective syntax element is indicative of whether or not sub-DPB parameters are signaled for each respective sub-layer of the one or more sub-layers other than the first sub-layer of the first particular output layer set;
receiving, from the encoded video bitstream, a respective set of sub-DPB parameters for the first sub-layer of each respective plurality of sub-layers; and
performing a sub-DPB management process on the one or more sub-DPBs in accordance with each respective set of sub-DPB parameters received.

2. The method of claim 1, wherein each respective set of sub-DPB parameters for the first sub-layer of each respective plurality of sub-layers includes at least one of:
a respective third syntax element indicative of a maximum number of reorder pictures allowed for the one or more sub-DPBs; or
a respective fourth syntax element indicative of a maximum latency allowed for the one or more sub-DPBs.

3. The method of claim 1, wherein receiving the respective set of sub-DPB parameters comprises receiving the respective set of sub-DPB parameters in a video parameter set (VPS).

4. The method of claim 1, further comprising:
applying, based on the first respective syntax element indicating that sub-DPB parameters are not signaled for each sub-layer of a second particular output layer set of the plurality of output layer sets, the respective set of sub-DPB parameters of the second particular output layer set to all sub-layers of the second particular output layer set.

5. The method of claim 1, further comprising:
receiving each second respective syntax element for each sub-layer of the one or more sub-layers other than the first sub-layer of the first particular output layer set when the first respective syntax element indicating that sub-DPB parameters are signaled for each sub-layer of the first particular output layer set.

6. The method of claim 1, further comprising:
applying, based on the second respective syntax element indicating that sub-DPB parameters are not signaled for a particular sub-layer of the one or more sub-layers other than the first sub-layer of the first particular output layer set, a last received respective set of sub-DPB parameters for the particular sub-layer; or
receiving, when the second respective syntax element is indicative that sub-DPB parameters are signaled for the particular sub-layer of the one or more sub-layers other than the first sub-layer of the first particular output layer set, a respective set of sub-DPB parameters for the particular sub-layer.

7. The method of claim 1, further comprising:
applying, based on the second respective syntax element indicating that sub-DPB parameters are not signaled for a particular sub-layer with a sub-layer ID X, a last received respective set of sub-DPB parameters for each sub-layers of the one or more sub-layers other than the first sub-layer of the first particular output layer set that have a respective sub-layer ID greater than X, wherein the particular sub-layer with the sub-layer ID X is one of the one or more sub-layers other than the first sub-layer of the first particular output layer set.

8. The method of claim 1, wherein the sub-DPB management process includes at least one of marking pictures as unused for reference, marking pictures for output, or removing pictures from the sub-DPB, and wherein the performing the sub-DPB management process comprises performing the sub-DPB management process on an access unit level using the received respective sets of sub-DPB parameters.

9. The method of claim 8, wherein performing the sub-DPB management process on the access unit level comprises:
outputting pictures based on the number of access units in a first sub-DPB of the one or more sub-DPBs that contain at least one picture marked as needed for output;
marking pictures as unused for reference on a per-layer level; and
removing pictures from the first sub-DPB on a per-layer level.

10. An apparatus configured to decode video data, the apparatus comprising:
one or more memory devices comprising one or more sub-decoded picture buffers (DPBs) configured to store video data; and
a video decoder configured to:
receive, from an encoded video bitstream, a plurality of output layer sets, wherein each output layer set of the plurality of output layer sets includes a respective plurality of sub-layers, wherein each respective plurality of sub-layers includes a first sub-layer and one or more sub-layers other than the first sub-layer, wherein the first sub-layer of each respective plurality of sub-layers is a base sub-layer;
decode each respective plurality of sub-layers of the plurality of output layer sets;
store each respective decoded plurality of sub-layers in the one or more sub-DPBs;
receive, from the encoded video bitstream, a first respective syntax element for each output layer set of the plurality of output layer sets, wherein each first respective syntax element is indicative of whether or not sub-DPB parameters are signaled for each sub-layer of each respective output layer set;
receive, from the encoded video bitstream, a second respective syntax element for each sub-layer of the one or more sub-layers other than the first sub-layer of a first particular output layer set of the plurality of output layer sets but not for the first sub-layer of the first particular output layer set, wherein each second respective syntax element is indicative of whether or not sub-DPB parameters are signaled for each respective sub-layer of the one or more sub-layers other than the first sub-layer of the first particular output layer set;
receive, from the encoded video bitstream, a respective set of sub-DPB parameters for the first sub-layer of each respective plurality of sub-layers; and
perform a sub-DPB management process on the one or more sub-DPBs in accordance with each respective set of sub-DPB parameters received.

11. The apparatus of claim 10, wherein each respective set of sub-DPB parameters for the first sub-layer of each respective plurality of sub-layers includes at least one of:
a respective third syntax element indicative of a maximum number of reorder pictures allowed for the one or more sub-DPBs; or
a respective fourth syntax element indicative of a maximum latency allowed for the one or more sub-DPBs.

12. The apparatus of claim 10, wherein the video decoder is configured to receive the respective set of sub-DPB parameters in a video parameter set (VPS).

13. The apparatus of claim 10, wherein the video decoder is further configured to:
apply, based on the first respective syntax element indicating that sub-DPB parameters are not signaled for each sub-layer of a second particular output layer set of the plurality of output layer sets, the respective set of sub-DPB parameters of the second particular output layer set to all sub-layers of the second particular output layer set.

14. The apparatus of claim 10, wherein the video decoder is further configured to:
receive each second respective syntax element for each sub-layer of the one or more sub-layers other than the first sub-layer of the first particular output layer set when the first respective syntax element indicating that sub-DPB parameters are signaled for each sub-layer of the first particular output layer set.

15. The apparatus of claim 10, wherein the video decoder is further configured to:
apply, based on the second respective syntax element indicating that sub-DPB parameters are not signaled for a particular sub-layer of the one or more sub-layers other than the first sub-layer of the first particular output layer set, a last received respective set of sub-DPB parameters for the particular sub-layer; or
receive, when the second respective syntax element is indicative that sub-DPB parameters are signaled for the particular sub-layer of the one or more sub-layers other than the first sub-layer of the first particular output layer set, a respective set of sub-DPB parameters for the particular sub-layer.

16. The apparatus of claim 10, wherein the video decoder is further configured to:
apply, based on the second respective syntax element indicating that sub-DPB parameters are not signaled for a particular sub-layer with a sub-layer ID X, a last received respective set of sub-DPB parameters for sub-layers of the one or more sub-layers other than the first sub-layer of the first particular output layer set that have a respective sub-layer ID greater than X, wherein the particular sub-layer with the sub-layer ID X is one of the one or more sub-layers other than the first sub-layer of the first particular output layer set.

17. The apparatus of claim 10, wherein the sub-DPB management process includes at least one of marking pictures as unused for reference, marking pictures for output, or removing pictures from the sub-DPB, and wherein the performing the sub-DPB management process comprises performing the sub-DPB management process on an access unit level using the received respective sets of sub-DPB parameters.

18. The apparatus of claim 17, wherein the video decoder is further configured to:

output pictures based on the number of access units in a first sub-DPB of the one or more sub-DPBs that contain at least one picture marked as needed for output;

mark pictures as unused for reference on a per-layer level; and remove pictures from the first sub-DPB on a per-layer level.

19. An apparatus configured to decode video data, the apparatus comprising:

means for receiving, from an encoded video bitstream, a plurality of output layer sets, wherein each output layer set of the plurality of output layer sets includes a respective plurality of sub-layers, wherein each respective plurality of sub-layers includes a first sub-layer and one or more sub-layers other than the first sub-layer, wherein the first sub-layer of each respective plurality of sub-layers is a base sub-layer;

means for decoding each respective plurality of sub-layers of the plurality of output layer sets;

means for storing each respective decoded plurality of sub-layers in one or more sub-decoded picture buffers (DPBs);

means for receiving, from the encoded video bitstream, a first respective syntax element for each output layer set of the plurality of output layer sets, wherein each first respective syntax element is indicative of whether or not sub-DPB parameters are signaled for each sub-layer of each respective output layer set;

means for receiving, from the encoded video bitstream, a second respective syntax element for each sub-layer of the one or more sub-layers other than the first sub-layer of a first particular output layer set of the plurality of output layer sets but not for the first sub-layer of the first particular output layer set, wherein each second respective syntax element is indicative of whether or not sub-DPB parameters are signaled for each respective sub-layer of the one or more sub-layers other than the first sub-layer of the first particular output layer set;

means for receiving, from the encoded video bitstream, a respective set of sub-DPB parameters for the first sub-layer of each respective plurality of sub-layers; and means for performing a sub-DPB management process on the one or more sub-DPBs in accordance with each respective set of sub-DPB parameters received.

20. A non-transitory computer-readable storage medium having instructions stored thereon that, when executed, cause one or more processors of a device configured to decode video data to:

receive, from an encoded video bitstream, a plurality of output layer sets, wherein each output layer set of the plurality of output layer sets includes a respective plurality of sub-layers, wherein each respective plurality of sub-layers includes a first sub-layer and one or more sub-layers other than the first sub-layer, wherein the first sub-layer of each respective plurality of sub-layers is a base sub-layer;

decode each respective plurality of sub-layers of the plurality of output layer sets;

store each respective decoded plurality of sub-layers in one or more sub- DPBs;

receive, from the encoded video bitstream, a first respective syntax element for each output layer set of the plurality of output layer sets, wherein each first respective syntax element is indicative of whether or not sub-DPB parameters are signaled for each sub-layer of each respective output layer set;

receive, from the encoded video bitstream, a second respective syntax element for each sub-layer of the one or more sub-layers other than the first sub-layer of a first particular output layer set of the plurality of output layer sets but not for the first sub-layer of the first particular output layer set, wherein each second respective syntax element is indicative of whether or not sub-DPB parameters are signaled for each respective sub-layer of the one or more sub-layers other than the first sub-layer of the first particular output layer set;

receive, from the encoded video bitstream, a respective set of sub-DPB parameters for the first sub-layer of each respective plurality of sub-layers; and perform a sub-DPB management process on the one or more sub-DPBs in accordance with each respective set of sub-DPB parameters received.

21. A method of encoding video data, the method comprising:

reconstructing a plurality of output layer sets of an encoded video bitstream, wherein each output layer set of the plurality of output layer sets includes a respective plurality of sub-layers, wherein each respective plurality of sub-layers includes a first sub-layer and one or more sub-layers other than the first sub-layer, wherein the first sub-layer of each respective plurality of sub-layers is a base sub-layer, wherein reconstructing the plurality of output layer sets includes reconstructing each respective plurality of sub-layers of the plurality of output layer sets;

storing each respective reconstructed plurality of sub-layers in one or more sub-decoded picture buffers (DPBs);

generating a first respective syntax element for each output layer set of the plurality of output layer sets, wherein each first respective syntax element is indicative of whether or not sub-DPB parameters are signaled for each sub-layer of each respective output layer set;

generating a second respective syntax element for each sub-layer of the one or more sub-layers other than the first sub-layer of a first particular output layer set of the plurality of output layer sets but not for the first sub-layer of the first particular output layer set, wherein each second respective syntax element is indicative of whether or not sub-DPB parameters are signaled for each respective sub-layer of the one or more sub-layers other than the first sub-layer of the first particular output layer set;

generating a respective set of sub-DPB parameters for the first sub-layer of each respective plurality of sub-layers;

performing a sub-DPB management process on the one or more sub-DPBs in accordance with each respective set of sub-DPB parameters received; and generating each respective set of sub-DPB parameters in the encoded video bitstream.

22. The method of claim 21, wherein each respective set of sub-DPB parameters for the first sub-layer of each respective plurality of sub-layers includes at least one of:

a respective third syntax element indicative of a maximum number of reorder pictures allowed for the one or more sub-DPBs; or a respective fourth syntax element indicative of a maximum latency allowed for the one or more sub-DPBs.

23. The method of claim 21, wherein generating the respective set of sub-DPB parameters comprises generating the respective set of sub-DPB parameters in a video parameter set (VPS).

24. The method of claim 21, further comprising:
generating, in the encoded video bitstream, each first respective syntax element for each output layer set of the plurality of output layer sets; and
generating, in the encoded video bitstream, each second respective syntax element for each sub-layer of the one or more sub-layers other than the first sub-layer of a first particular output layer set of the plurality of output layer sets.

25. The method of claim 21, further comprising:
generating each second respective syntax element for each sub-layer of the one or more sub-layers other than the first sub-layer of the first particular output layer set based on the first respective syntax element indicating that sub-DPB parameters are signaled for each sub-layer of the first particular output layer set.

26. The method of claim 21, further comprising:
generating, based on the second respective syntax element indicating that sub-DPB parameters are signaled for a particular sub-layer of the one or more sub-layers other than the first sub-layer of the first particular output layer set, a respective set of sub-DPB parameters for the particular sub-layer.

27. The method of claim 21, wherein the sub-DPB management process includes at least one of marking pictures as unused for reference, marking pictures for output, or removing pictures from the sub-DPB, and wherein the performing the sub-DPB management process comprises performing the sub-DPB management process on an access unit level using the received respective sets of sub-DPB parameters.

28. The method of claim 27, wherein performing the sub-DPB management process on the access unit level comprises:
outputting pictures based on the number of access units in a first sub-DPB of the one or more sub-DPBs that contain at least one picture marked as needed for output;
marking pictures as unused for reference on a per-layer level; and
removing pictures from the first sub-DPB on a per-layer level.

29. An apparatus configured to encode video data, the apparatus comprising:
one or more memory devices comprising one or more sub-decoded picture buffers (DPBs) configured to store video data; and
a video encoder configured to:
reconstruct a plurality of output layer sets of an encoded video bitstream, wherein each output layer set of the plurality of output layer sets includes a respective plurality of sub-layers, wherein each respective plurality of sub-layers includes a first sub-layer and one or more sub-layers other than the first sub-layer, wherein the first sub-layer of each respective plurality of sub-layers is a base sub-layer, wherein reconstructing the plurality of output layer sets includes reconstructing each respective plurality of sub-layers of the plurality of output layer sets;
store each respective reconstructed plurality of sub-layers in the one or more sub-DPBs;
generate a first respective syntax element for each output layer set of the plurality of output layer sets, wherein each first respective syntax element is indicative of whether or not sub-DPB parameters are signaled for each sub-layer of each respective output layer set;
generate a second respective syntax element for each sub-layer of the one or more sub-layers other than the first sub-layer of a first particular output layer set of the plurality of output layer sets but not for the first sub-layer of the first particular output layer set, wherein each second respective syntax element is indicative of whether or not sub-DPB parameters are signaled for each respective sub-layer of the one or more sub-layers other than the first sub-layer of the first particular output layer set;
generate a respective set of sub-DPB parameters for the first sub-layer of each respective plurality of sub-layers;
perform a sub-DPB management process on the one or more sub-DPBs in accordance with each respective set of sub-DPB parameters received; and
generate each respective set of sub-DPB parameters in the encoded video bitstream.

30. The apparatus of claim 29, wherein each respective set of sub-DPB parameters for the first sub-layer of each respective plurality of sub-layers includes at least one of:
a respective third syntax element indicative of a maximum number of reorder pictures allowed for the one or more sub-DPBs; or
a respective fourth syntax element indicative of a maximum latency allowed for the one or more sub-DPBs.

31. The apparatus of claim 29, wherein the video encoder is configured to generate the respective set of sub-DPB parameters in a video parameter set (VPS).

32. The apparatus of claim 29, wherein the video encoder is further configured to:
generate, in the encoded video bitstream, each first respective syntax element for each output layer set of the plurality of output layer sets; and
generate, in the encoded video bitstream, each second respective syntax element for each sub-layer of the one or more sub-layers other than the first sub-layer of a first particular output layer set of the plurality of output layer sets.

33. The apparatus of claim 29, wherein the video encoder is further configured to:
generate each second respective syntax element for each sub-layer of the one or more sub-layers other than the first sub-layer of the first particular output layer set based on the first respective syntax element indicating that sub-DPB parameters are signaled for each sub-layer of the first particular output layer set.

34. The apparatus of claim 29, wherein the video encoder is further configured to:
generate, based on the second respective syntax element indicating that sub-DPB parameters are signaled for a particular sub-layer of the one or more sub-layers other than the first sub-layer of the first particular output layer set, a respective set of sub-DPB parameters for the particular sub-layer.

35. The apparatus of claim 29, wherein the sub-DPB management process includes at least one of marking pictures as unused for reference, marking pictures for output, or removing pictures from the sub-DPB, and wherein the performing the sub-DPB management process comprises performing the sub-DPB management process on an access unit level using the received respective sets of sub-DPB parameters.

36. The apparatus of claim 35, wherein the video encoder is further configured to:

output pictures based on the number of access units in a first sub-DPB of the one or more sub-DPBs that contain at least one picture marked as needed for output;

mark pictures as unused for reference on a per-layer level; and remove pictures from the first sub-DPB on a per-layer level.

37. An apparatus configured to encode video data, the apparatus comprising:

means for reconstructing a plurality of output layer sets of an encoded video bitstream, wherein each output layer set of the plurality of output layer sets includes a respective plurality of sub-layers, wherein each respective plurality of sub-layers includes a first sub-layer and one or more sub-layers other than the first sub-layer, wherein the first sub-layer of each respective plurality of sub-layers is a base sub-layer, wherein reconstructing the plurality of output layer sets includes reconstructing each respective plurality of sub-layers of the plurality of output layer sets;

means for storing each respective reconstructed plurality of sub-layers in one or more sub-decoded picture buffers (DPBs);

means for generating a first respective syntax element for each output layer set of the plurality of output layer sets, wherein each first respective syntax element is indicative of whether or not sub-DPB parameters are signaled for each sub-layer of each respective output layer set;

means for generating a second respective syntax element for each sub-layer of the one or more sub-layers other than the first sub-layer of a first particular output layer set of the plurality of output layer sets but not for the first sub-layer of the first particular output layer set, wherein each second respective syntax element is indicative of whether or not sub-DPB parameters are signaled for each respective sub-layer of the one or more sub-layers other than the first sub-layer of the first particular output layer set;

means for generating a respective set of sub-DPB parameters for the first sub-layer of each respective plurality of sub-layers;

means for performing a sub-DPB management process on the one or more sub-DPBs in accordance with each respective set of sub-DPB parameters received; and means for generating each respective set of sub-DPB parameters in the encoded video bitstream.

38. A non-transitory computer-readable storage medium having instructions stored thereon that, when executed, cause one or more processors of a device configured to encode video data to:

reconstruct a plurality of output layer sets of an encoded video bitstream, wherein each output layer set of the plurality of output layer sets includes a respective plurality of sub-layers, wherein each respective plurality of sub-layers includes a first sub-layer and one or more sub-layers other than the first sub-layer, wherein the first sub-layer of each respective plurality of sub-layers is a base sub-layer, wherein reconstructing the plurality of output layer sets includes reconstructing each respective plurality of sub-layers of the plurality of output layer sets;

store each respective reconstructed plurality of sub-layers in one or more sub-decoded picture buffers (DPBs);

generate a first respective syntax element for each output layer set of the plurality of output layer sets, wherein each first respective syntax element is indicative of whether or not sub-DPB parameters are signaled for each sub-layer of each respective output layer set;

generate a second respective syntax element for each sub-layer of the one or more sub-layers other than the first sub-layer of a first particular output layer set of the plurality of output layer sets but not for the first sub-layer of the first particular output layer set, wherein each second respective syntax element is indicative of whether or not sub-DPB parameters are signaled for each respective sub-layer of the one or more sub-layers other than the first sub-layer of the first particular output layer set;

generate a respective set of sub-DPB parameters for the first sub-layer of each respective plurality of sub-layers;

perform a sub-DPB management process on the one or more sub-DPBs in accordance with each respective set of sub-DPB parameters received; and generate each respective set of sub-DPB parameters in the encoded video bitstream.

* * * * *